(12) United States Patent
Lebedev et al.

(10) Patent No.: US 9,197,428 B1  
(45) Date of Patent: Nov. 24, 2015

(54) METHODS AND APPARATUS FOR REQUESTING MESSAGE GAP FILL REQUESTS AND RESPONDING TO MESSAGE GAP FILL REQUESTS

(75) Inventors: Alexei Lebedev, New York, NY (US); Vladimir Parizhsky, New York, NY (US)

(73) Assignee: NYSE ARCA LLC, Chicago, IL (US)

( * ) Notice: Subject to any disclaimer, the term of this patent is extended or adjusted under 35 U.S.C. 154(b) by 197 days.

(21) Appl. No.: 13/289,777

(22) Filed: Nov. 4, 2011

Related U.S. Application Data

(60) Provisional application No. 61/552,414, filed on Oct. 27, 2011, provisional application No. 61/548,691, filed on Oct. 18, 2011, provisional application No. 61/543,798, filed on Oct. 5, 2011, provisional (Continued)

(51) Int. Cl.
*G06F 15/16* (2006.01)
*H04L 12/18* (2006.01)

(52) U.S. Cl.
CPC .................. *H04L 12/185* (2013.01)

(58) Field of Classification Search
CPC .................................................. H01L 12/185
USPC .............. 709/201–207, 227–231; 379/93.01, 379/201.01–218.01; 370/259–267; 348/14.01–14.16
See application file for complete search history.

(56) References Cited

U.S. PATENT DOCUMENTS

| | | | |
|---|---|---|---|
| 5,809,483 A | 9/1998 | Broka et al. | |
| 6,430,616 B1 * | 8/2002 | Brinnand et al. | 709/224 |
| 6,567,851 B1 | 5/2003 | Kobayashi | |
| 6,938,021 B2 | 8/2005 | Shear et al. | |
| 6,965,883 B2 | 11/2005 | Xi et al. | |
| 7,035,257 B2 | 4/2006 | Vafaei | |
| 7,281,058 B1 * | 10/2007 | Shepherd et al. | 709/238 |
| 7,613,160 B2 | 11/2009 | Kitchin | |

(Continued)

FOREIGN PATENT DOCUMENTS

WO   WO2008020731   2/2008

OTHER PUBLICATIONS

U.S. Appl. No. 13/253,732, Methods and Apparatus for Performing Risk Checking, filed Oct. 5, 2011, pp. 1-27 including cover sheet.

(Continued)

*Primary Examiner* — Brian J Gillis
*Assistant Examiner* — Michael A Keller
(74) *Attorney, Agent, or Firm* — Straub & Pokotylo; Michael P. Straub; Stephen T. Straub

(57) ABSTRACT

Various embodiments are directed to gap fill methods and apparatus. In an exchange system a device in the exchange may request a message gap fill when it detects that it may be missing one or more messages. The gap fill message may include a range of message identifiers or message counter values identifying the messages which are being requested by the multicast gap fill message. A message logging system included in the exchange may include a plurality of message logging devices. A multicast gap fill message may specify a set of messages to be provided which is very large. Multiple devices may respond to the requesting device with the responding device providing one, multiple or all the messages. Replies to multicast gap fill request messages are sent in the form of unicast messages from directed to the device which sent the multicast gap fill request message.

20 Claims, 22 Drawing Sheets

Related U.S. Application Data application No. 61/543,804, filed on Oct. 5, 2011, provisional application No. 61/543,309, filed on Oct. 4, 2011, provisional application No. 61/543,290, filed on Oct. 4, 2011, provisional application No. 61/543,304, filed on Oct. 4, 2011, provisional application No. 61/417,197, filed on Nov. 24, 2010, provisional application No. 61/426,490, filed on Dec. 22, 2010.

(56) References Cited

U.S. PATENT DOCUMENTS

| | | | |
|---|---|---|---|
| 7,685,281 | B1 | 3/2010 | Saraiya et al. |
| 7,885,882 | B1 | 2/2011 | Brander et al. |
| 8,060,598 | B1 | 11/2011 | Cook et al. |
| 8,391,885 | B2 | 3/2013 | Song et al. |
| 2001/0049649 | A1 | 12/2001 | Baecker et al. |
| 2002/0069155 | A1 | 6/2002 | Nafeh et al. |
| 2002/0161828 | A1 | 10/2002 | Edison et al. |
| 2003/0007490 | A1 | 1/2003 | Yi et al. |
| 2003/0050955 | A1* | 3/2003 | Eatough et al. ............... 709/201 |
| 2003/0096605 | A1 | 5/2003 | Schlieben et al. |
| 2003/0101283 | A1 | 5/2003 | Lewis et al. |
| 2004/0064351 | A1 | 4/2004 | Mikurak |
| 2005/0149428 | A1 | 7/2005 | Gooch et al. |
| 2005/0283427 | A1 | 12/2005 | Owens et al. |
| 2006/0085317 | A1 | 4/2006 | Allen |
| 2006/0133376 | A1 | 6/2006 | Valdevit |
| 2006/0161625 | A1* | 7/2006 | Norp et al. ................... 709/206 |
| 2006/0259560 | A1 | 11/2006 | Han et al. |
| 2006/0285527 | A1 | 12/2006 | Gao et al. |
| 2006/0285528 | A1 | 12/2006 | Gao et al. |
| 2007/0266170 | A1* | 11/2007 | Mockett ........................ 709/231 |
| 2008/0117911 | A1 | 5/2008 | Rajakaurunanayake et al. |
| 2009/0052450 | A1* | 2/2009 | Mockett ........................ 370/390 |
| 2009/0067358 | A1 | 3/2009 | Fischer |
| 2009/0077567 | A1 | 3/2009 | Craddock et al. |
| 2009/0132410 | A1 | 5/2009 | Penney et al. |
| 2009/0157797 | A1* | 6/2009 | Chang et al. .................. 709/202 |
| 2009/0164648 | A1* | 6/2009 | Xu et al. ........................ 709/228 |
| 2009/0219945 | A1 | 9/2009 | Blagojevic et al. |
| 2009/0248886 | A1* | 10/2009 | Tan et al. ....................... 709/231 |
| 2009/0281954 | A1 | 11/2009 | Waelbroeck et al. |
| 2009/0282111 | A1* | 11/2009 | Jacobs et al. .................. 709/206 |
| 2010/0014519 | A1 | 1/2010 | Gutierrez |
| 2010/0058118 | A1 | 3/2010 | Yamaoka |
| 2010/0094743 | A1 | 4/2010 | Robertson et al. |
| 2010/0106851 | A1* | 4/2010 | Aoki et al. ..................... 709/231 |
| 2010/0115099 | A1* | 5/2010 | Gu et al. ........................ 709/226 |
| 2010/0202453 | A1 | 8/2010 | Bauza et al. |
| 2010/0220709 | A1 | 9/2010 | Peisa |
| 2011/0040669 | A1 | 2/2011 | Lee et al. |
| 2011/0126060 | A1 | 5/2011 | Grube et al. |
| 2011/0166982 | A1 | 7/2011 | Cole et al. |
| 2011/0178915 | A1 | 7/2011 | Vinokour et al. |
| 2011/0252152 | A1 | 10/2011 | Sherry et al. |
| 2011/0264578 | A1 | 10/2011 | Chapman et al. |
| 2011/0305170 | A1* | 12/2011 | Lai et al. ....................... 370/261 |
| 2013/0117426 | A1 | 5/2013 | Saraiya et al. |

OTHER PUBLICATIONS

U.S. Appl. No. 13/289,818, Messaging Methods and Apparatus for Use With an Exchange System and/or Client Devices, filed Nov. 4, 2011, pp. 1-67 including cover sheet.

U.S. Appl. No. 13/289,891, Methods and Apparatus for Using Multicast Messaging in a System for Implementing Transactions, filed Nov. 4, 2011, pp. 1-88 including cover sheet.

U.S. Appl. No. 13/289,873, Methods and Apparatus for Detecting Gaps in a Sequence of Messages, Requesting Missing Messages and/or Responding to Requests for Messages, filed Nov. 4, 2011, pp. 1-64 including cover sheet.

* cited by examiner

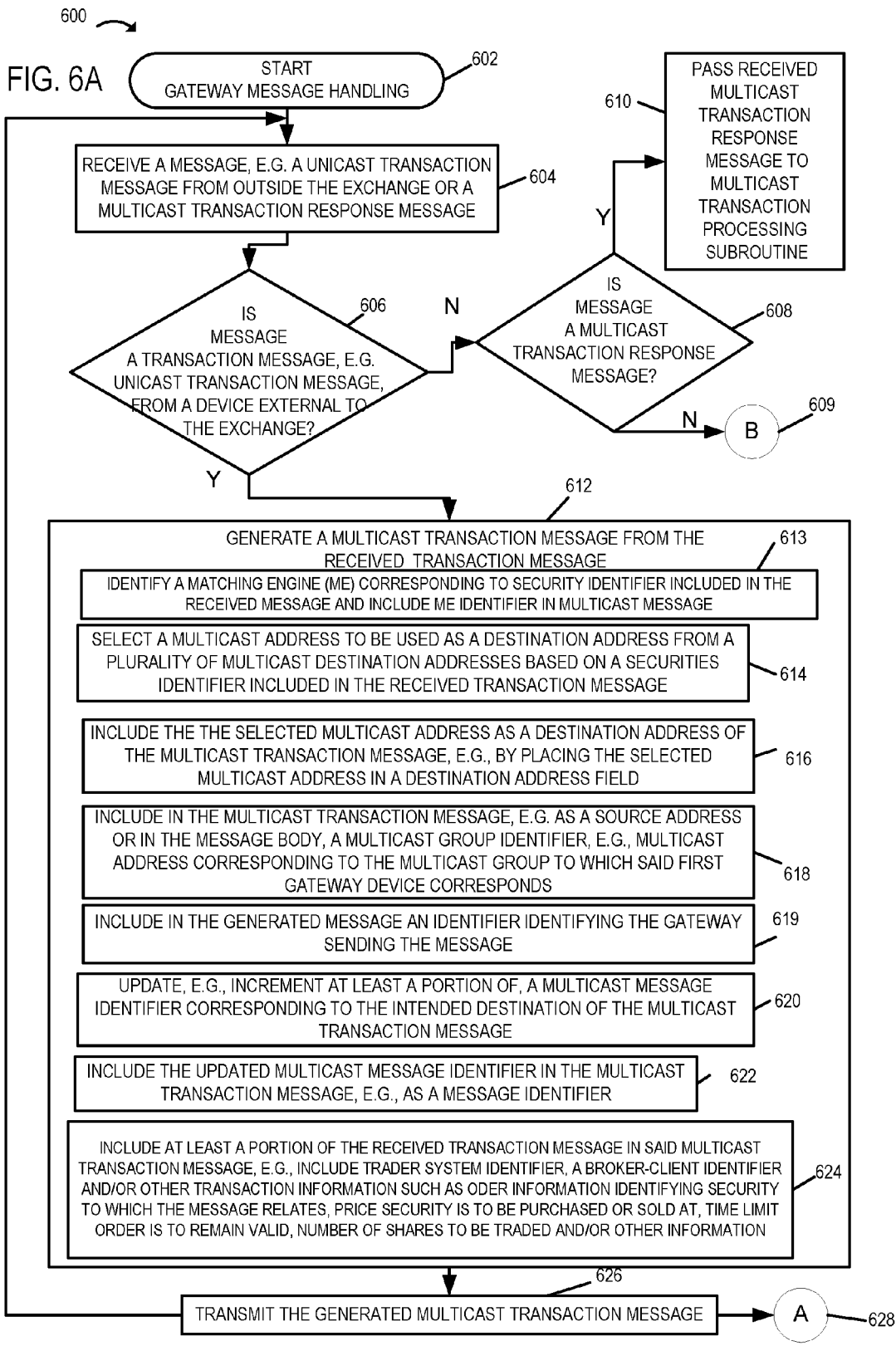

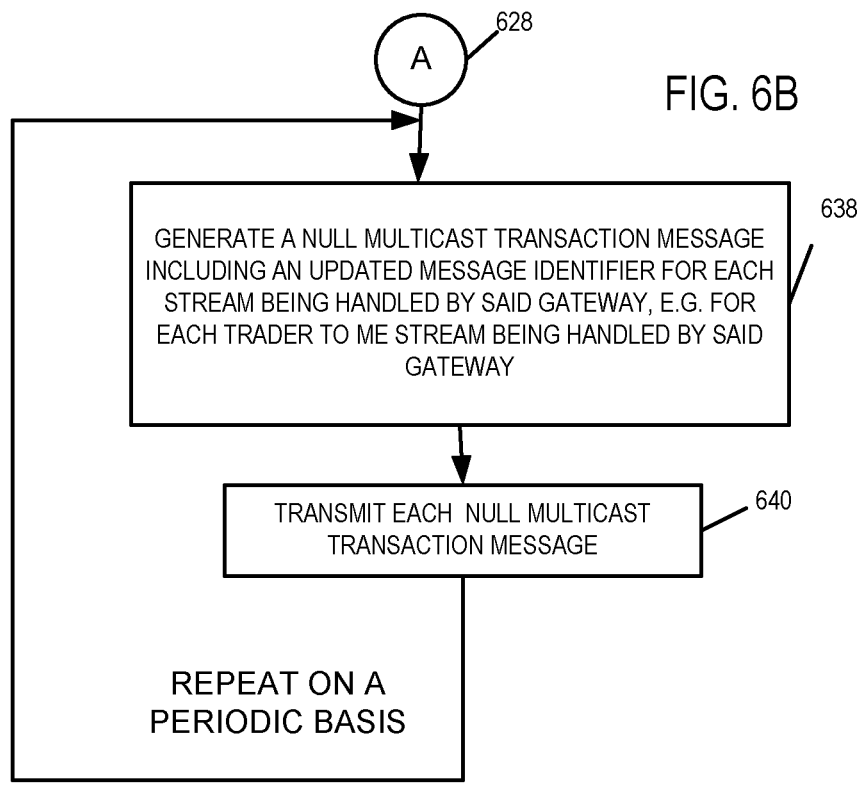

METHODS AND APPARATUS FOR REQUESTING MESSAGE GAP FILL REQUESTS AND RESPONDING TO MESSAGE GAP FILL REQUESTS

RELATED APPLICATION

The present application claims the benefit of the filing date of U.S. Provisional Patent Application Ser. No. 61/552,414, filed on Oct. 27, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/548,691, filed on Oct. 18, 2011 and titled "MESSAGING METHODS AND APPARATUS FOR USE IN AN EXCHANGE SYSTEM"; claims the benefit of the filing date of U.S. Provisional Patent Application Ser. No. 61/543,798, filed on Oct. 5, 2011 and titled "MESSAGING METHODS AND APPARATUS FOR USE IN AN EXCHANGE SYSTEM"; claims the benefit of the filing date of U.S. Provisional Patent Application Ser. No. 61/543,804, filed on Oct. 5, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/543,309, filed on Oct. 4, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/543,290, filed on Oct. 4, 2011 and titled "METHODS AND APPARATUS FOR PERFORMING RISK CHECKING"; claims the benefit of the filing date of U.S. Provisional Patent Application Ser. No. 61/543,304, filed on Oct. 4, 2011 and titled "MESSAGING METHODS AND APPARATUS FOR USE IN AN EXCHANGE SYSTEM"; claims the benefit of the filing date of U.S. Provisional Patent Application Ser. No. 61/417,197, filed on Nov. 24, 2010 and titled "METHODS AND APPARATUS FOR PERFORMING RISK CHECKING UNDER BROKER CONTROL"; claims the benefit of the filing date of U.S. Provisional Patent Application Ser. No. 61/426,490, filed on Dec. 22, 2010 and titled "MESSAGING METHODS AND APPARATUS FOR RESTORING MESSAGE SYNCHRONIZATION BETWEEN A TRADER'S SYSTEM AND AN ELECTRONIC COMMUNICATIONS NETWORK"; all of which are hereby expressly incorporated by reference in their entirety.

FIELD

The present application relates to methods and apparatus for use in transaction systems, e.g., electronic communications networks, which implementing transactions, e.g., trades, based on received messages and, more particularly, to methods and apparatus for using multicast messaging in a transaction system.

BACKGROUND

Transaction systems implement a transaction based on one or more received messages. Electronic exchanges, implemented as Electronic Communication Networks (ECNs), are an example of a system used to electronically trade a wide range of commodities, stocks and/or other items having real world significance. An ECN normally receives messages, e.g., an order from a trader, performs a matching operation, and if a matching order exists, performs a trade. The resulting trade is reported to the traders which placed the matching orders and also to a public system, e.g., for updating published information about the current price of a stock, commodity or other item being traded on the exchange.

Electronic trading on an electronic exchange allows for large numbers of orders to be stored, processed, and executed at relatively low cost. The speed at which a trade can be executed is important since a delay in processing of a message including an order to buy or sell may affect the dollar amount at which the trade is made. While the speed at which a trading system can implement transactions is important, reliability and scalability are often other concerns of major importance.

Traders normally send unicast messages, e.g., orders, to a trading system and receive unicast messages in response to the order messages. To keep various parties aware of transactions, e.g., trades, which are implemented by the trading system, multicast messages may be transmitted advising subscribers to the trading system information on the orders placed and completed on the trading system.

In the case of a multicast message, the message is addressed to a multicast address corresponding to a multicast group. In the case of subscribers to a trading system which are to receive published information, the subscribers may be members of a multicast group to which published information is to be sent. When a order is placed or a trade is completed, the trading system may send a multicast message addressed to a multicast address corresponding to the subscriber group. Switches to which a member of the subscriber group is attached which received the multicast message will forward the message to the multiple group members who listen to the subscriber group multicast address to receive the published trading information to which they subscribe.

For a variety of reasons, multicast messaging is generally considered less reliable than unicast messaging where a message is directed from a source device to a single destination device, e.g., using a unicast address corresponding to the destination device, as opposed to multiple address corresponding to a group of devices which use the same multicast address for receiving messages. While multicast messaging is a convenient way to communicate information from a single source, e.g., a device which publishes trade and order information, it tends to suffer from reliability problems in that members of the group often do not know when to expect a message and/or may have trouble determining if they missed a message due to network forwarding problems and/or other reasons. Accordingly, for a variety of reasons, unicast messaging is traditionally used in a trading system for processing and responding to transaction messages while multicast messages may be used to publish information about orders and/or completed transactions to a list of subscribers.

Trading systems over time may be required to support increasing numbers of transactions while maintaining system reliability. In current trading systems including gateway devices and various servers used to implement a trading transaction, increasing the number of servers or replacing a server often requires changes in the hardware or addressing used by the gateway devices in the system. Similarly, changing or increasing the number of gateway devices often requires a change in the hardware and/or addressing used by the servers in the trading system. It would be desirable if methods and/or apparatus could be developed which could allow changes in servers and/or gateways without requiring changes in hardware or addressing and/or which could be implemented with reduced hardware/addressing changes as compared to known systems which use unicast messaging within a trading system to support trading transactions.

In view of the above, it should be appreciated that there is a need for improved methods of providing missing messages to regain message synchronization. In addition, there is a need for improved protocols and method of using sequence numbers. There is also a need for relieving a client gateway system of the obligation to supply a large number of missing messages to a trader system which has lost synchronization with the ECN. While there is much room for improvement it should be appreciated that systems and apparatus which address one or more of the above issues are useful and desirable and that all embodiments need not address all of the above discussed problems.

SUMMARY

Methods and apparatus for using multicast messaging to support transactions in a exchange system such as an electronic communication network (ECN) are described. The exchange system is particularly well suited for securities transactions, e.g., stock trading, but may be used to support a wide range of transactions.

Various embodiments are directed to gap fill methods and apparatus. In an exchange system a device in the exchange may request a message gap fill when it detects that it may be missing one or more messages. For example, a device such as a matching engine, gateway, monitor or other device in the exchange may receive a multicast message including a message identifier and determine that a message identifier included in the received multicast message does not match an expected message identifier. The discrepancy may be due to a message counter value includes as the message identifier or as a portion of a received message identifier being higher than the counter value that is expected given the last received message identifier corresponding to the same message stream as the received message. When it is determined that the received message identifier does not match the expected message identifier the device detecting the discrepancy may, and normally does transmit a multicast message requesting a message gap fill. The gap fill message may include a range of message identifiers or message counter values identifying the messages which are being requested by the multicast gap fill message.

A message logging system included in the exchange may include a plurality of message logging devices, e.g., a caching device for storing the most recent messages in the system, a medium term storage for storing messages which were transmitted during a recent time period, e.g., a time period of a few hours or minutes, and a device used for storage of older messages, e.g., messages several days old. More than one device may store the same messages for redundancy, load distribution and/or other reasons. Each of the message logging device may be members of the same multicast group to which multicast gap fill request messages are addressed. A multicast gap fill message may specify a set of messages to be provided which is very large, e.g., 50 thousand messages for example. In such a case, multiple devices may respond to the requesting device with the responding device providing one, multiple or all the messages. Replies to multicast gap fill request messages are sent in the form of unicast messages from directed to the device which sent the multicast gap fill request message.

In some embodiments in addition to including an identifier, e.g., unicast address, corresponding to the device sending the multicast gap fill request message, the multicast gap fill request message may, and often does include a preferred responder, e.g., message provider, or no identification of a preferred responder.

A message logging device which receives a multicast gap fill message request which does not identify a preferred responder and which can provide one or more of the requested messages, responds by sending the available requested message or messages to the requesting device in a unicast message or messages. The requesting device may receive the same requested message from multiple responder devices and thus learn of message logging devices which can respond in a timely manner. Based on how long it took a responder to respond with a requested message and/or other information the requesting device is able to rank responders which can be used as alternative sources of messages. In one embodiment, based on duplicative message responses, the requesting device selects one of the responders as a preferred responder and includes an identifier of the selected preferred responder in a subsequent multicast gap file request.

In some embodiments, in the case where a multicast gap fill request is received by a message logging device capable of providing the requested message or messages and the multicast gap fill request message indentifies a message logging device other than the receiving device as the preferred responder, the receiving message loggin device will still respond under conditions. For example the non-preferred message logging device will respond if it knows the preferred message logging device does not include the full set of requested messages, the preferred message logging device is unavailable to respond, e.g., due to a system fault or device loading.

A requesting device receiving requested messages from a logging device other than the preferred logging device may update its selection of the preferred logging device to identify the responding device as the preferred responder for purposes of future multicast gap fill request messages. Numerous variations on the gap fill methods are possible.

The above described methods and apparatus facilitate redundancy and scalability within an exchange, e.g., ECN, while still providing for a suitable level of fault tolerance and detection of lost messages in a timely manner. In view of the above discussion, it should be appreciated that use of multicast communications messages to communicate between elements of an exchange offers both implementation and management advantages over other approaches to communicating between elements of an exchange. The multicast methods of the present invention are particularly well suited for facilitating fast transaction and message processing times in an exchange where many or all the components are located physically close to one another, e.g., in the same building or floor of a building and coupled together by one or more switches which support multicast messaging functionality.

Numerous additional benefits, advantages, embodiments and details are discussed in the detailed description which follows.

DETAILED DESCRIPTION

Figure 1:
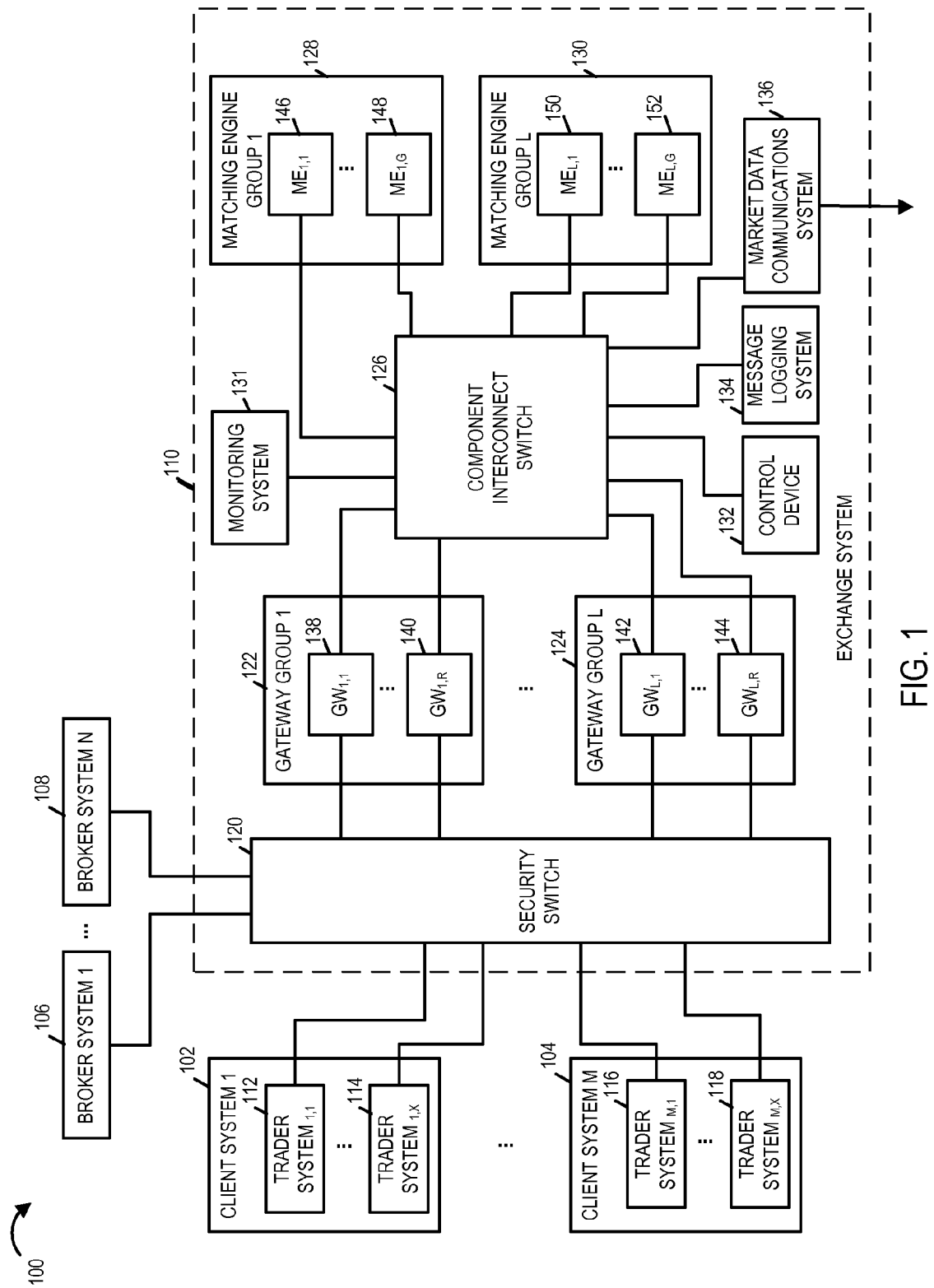
FIG. 1 illustrates a first exemplary trading system implemented in accordance with one embodiment of the invention.

FIG. 1 is a drawing of an exemplary system 100, e.g., a trading system, for implementing transactions in accordance with an exemplary embodiment. Exemplary system 100 includes a plurality of client systems (client system 1 102, ..., client system M 104), a plurality of broker systems (broker system 1 106, ..., broker system N 108), and an exchange system 110. Client system 1 102 includes a plurality of client devices (client device$_{1,1}$ 112, e.g., trader system$_{1,1}$, ..., client device$_{1,X}$ 114, e.g., trader system$_{1,X}$). Client system M 104 includes a plurality of client devices (client device$_{M,1}$ 116, e.g., trader system$_{M,1}$, ..., client device$_{M,X}$ 118, e.g., trader system$_{M,X}$). Exchange system 110 includes a security switch 120, a plurality of gateway groups (Gateway group 1 122, ..., Gateway group L 124), a component interconnect switch 126, a plurality of matching engine groups (matching engine group 1 128, ..., matching engine group L 130), a monitoring system 131, a control device 132, a message logging system 134, and a market data communications system 136. Gateway group 1 122 includes a plurality of gateways (GW$_{1,1}$ 138, ... GW$_{1,R}$ 140). Gateway group L 124 includes a plurality of gateways (GW$_{L,1}$ 142, ... GW$_{L,R}$ 144). Matching engine group 1 128 includes a plurality of matching engines (ME$_{1,1}$ 146, ... ME$_{1,G}$ 148). Matching engine group L 130 includes a plurality of matching engines (ME$_{L,1}$ 150, ... ME$_{L,G}$ 152). The trader systems (112, ..., 114, 116, ..., 118), broker systems (106, ..., 108) and gateways (138, ..., 140, 142, ..., 144) are coupled to the security switch. The gateways (138, ..., 140, 142, ..., 144), matching engines (146, ..., 148, 150, ..., 152), control device 132, message logging system 134, and market data communications system 136 are coupled to the component interconnect switch 126.

Figure 2:
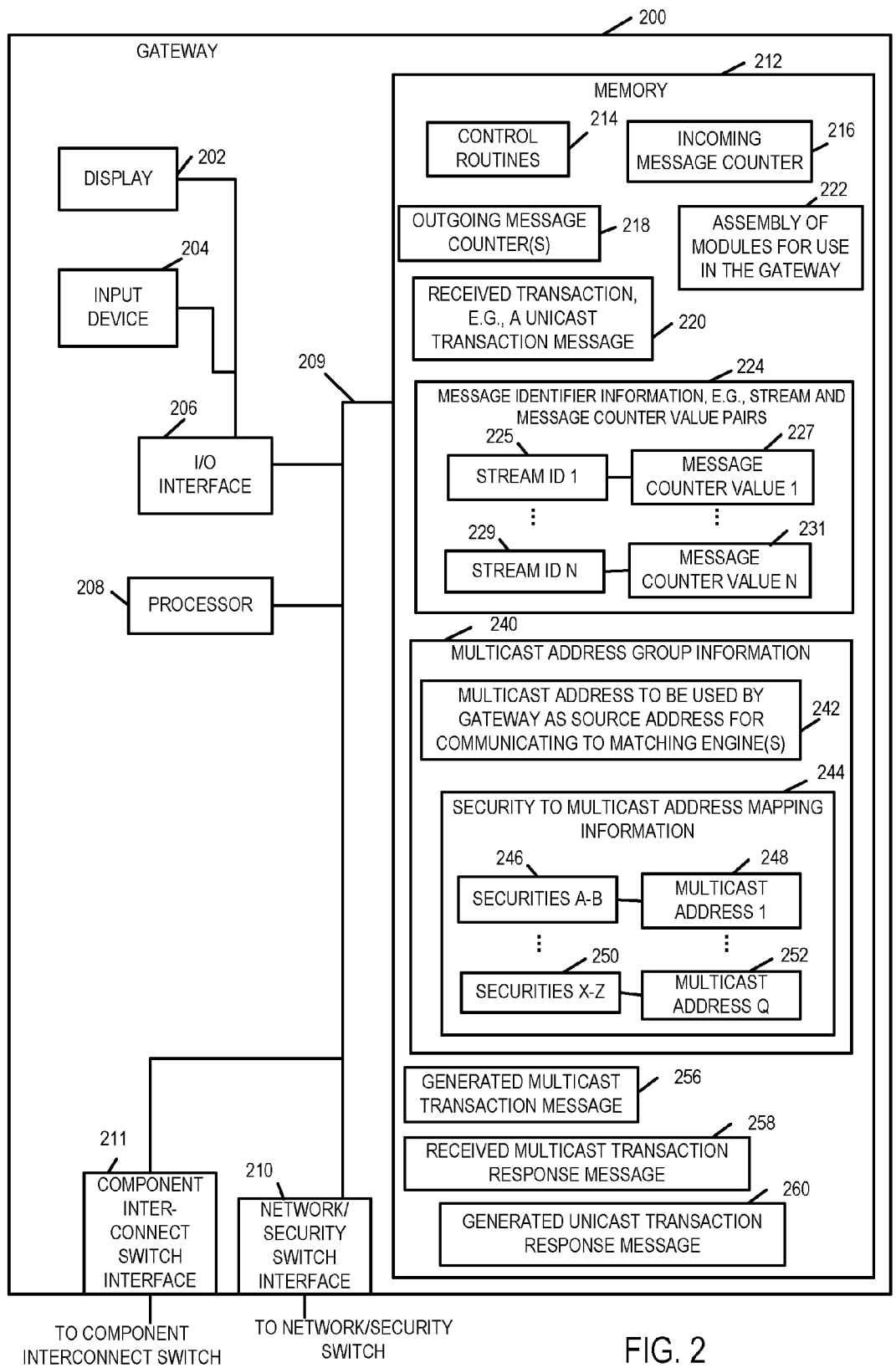
FIG. 2 is a drawing of an exemplary gateway device in accordance with an exemplary embodiment.

FIG. 2 is a drawing of an exemplary gateway device 200 in accordance with an exemplary embodiment. Exemplary gateway device 200 is, e.g., any of the gateway devices (138, ..., 140, 142, ..., 144) of exchange system 110 of system 100 of FIG. 1. Exemplary gateway device 200 includes a display 202, an input device 204, an I/O interface 206, a processor 208, a network/security switch interface 210, a component interconnect switch interface 211 and a memory 212 coupled together via a bus 209 over which the various elements may interchange data and information. The I/O interface 206 is coupled to the display 202 and the input device 204, e.g., keyboard, keypad, mouse, etc. The network/security switch interface 210 in various embodiments includes a receiver and a transmitter. Via the network/security switch interface 210 gateway device 200 can receive and/or send information including, e.g., receive transaction messages, send out transaction response messages to the trader systems, etc.

The network/security switch interface 210 includes the receiver configured to receive and process information, e.g. transaction messages. The transmission and reception through the network/security switch interface 210 is controlled under the direction of the processor 208 which executes one or more of the routines and/or modules included in memory 212 to control the operation of gateway 200.

Memory 212 includes routines, various modules and data/information. The processor 208, e.g., a CPU, may execute the routines 214 and various modules, and use the data/information in memory 212 to implement a method, e.g., a method in accordance with flowchart 600 of FIG. 6.

The memory 212 includes a control routines 214, an incoming message counter 216, an outgoing message counter 218, an assembly of modules 222, a received transaction message 220, multicast address group information 240, generated multicast transaction message 256, received multicast transaction response message 258, and generated unicast transaction response message 260. The processor 208 executes various modules included in the assembly of modules 222 to perform various operations in accordance with the invention. Included in the memory 212 is message identification information 224 which includes a plurality of stream identifier and message counter value pairs, e.g., a first pair 225, 227 and an Nth pair 229-231. The stream and message counter value of an individual pair can, and in some embodiments is, used a message identifier. Some of the stored stream and message counter pairs may serve as message identifiers corresponding to streams being received by the gateway 200 and may represent the message identifier which was last received in a message corresponding to the identified stream. Other ones of the stored stream and message counter pairs may serve as message identifiers corresponding to streams being transmitted by the gateway 200 and may represent the message identifier which was last transmitted in a message corresponding to the identified stream.

In accordance with various embodiments, the gateway device 200 receives a first transaction message, e.g., a unicast order message, from a trader, client or a broker system. Transaction messages sent by a trader and/or broker are received via a receiver in the network/security switch interface 210.

Figure 8:
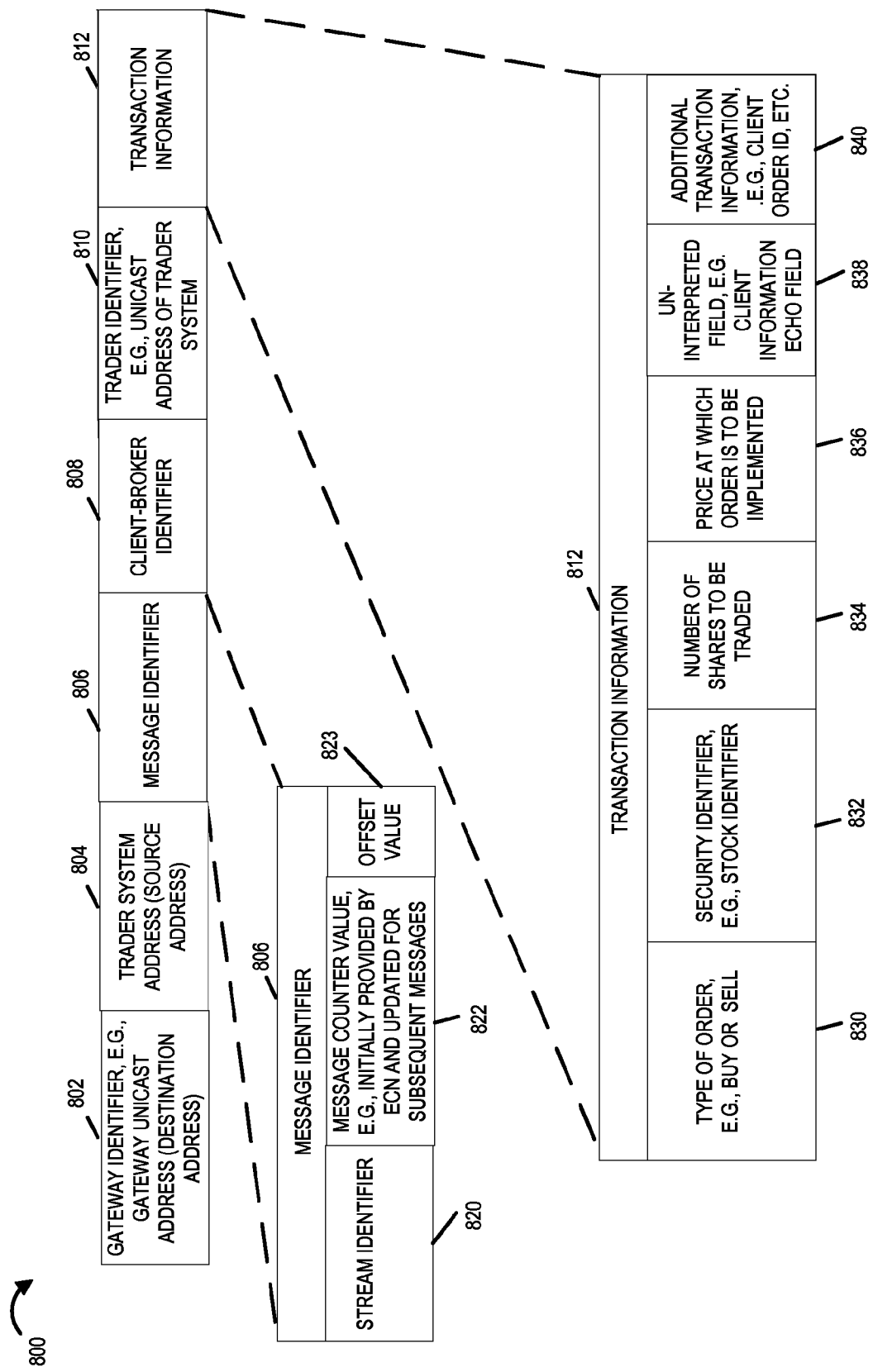
FIG. 8 illustrates an exemplary unicast transaction message, e.g., communicated from a trader system to a gateway device, in accordance with an exemplary embodiment.

The incoming message counter 216 keeps track of the incoming messages, e.g., transaction messages from trader systems, while the outgoing message counter 218 keeps track of the outgoing messages, e.g., transaction response messages to the broker, client and/or trader system. The assembly of modules 222 includes a plurality of modules which when executed by the processor 208, configure the processor, e.g., computer, 208 to implement the function corresponding to the module. In some embodiments, processor 208 is configured to implement each of the modules of the assembly of modules 222 to perform various operations in accordance with the method of flowchart 600 discussed later. The assembly of modules is illustrated in FIG. 8 and is discussed in detail below.

The received transaction message is a transaction message received from a trader system, e.g., trader system 112. In some embodiments the received transaction message is a unicast transaction message.

The multicast address group information 240 includes the multicast address 242 to be used by the gateway 200 as a source address for communicating information to matching engine(s). The multicast address group information 240 further includes security to multicast address mapping information 244. The information 244 information mapping securities to particular multicast addresses corresponding to a multicast group which includes a matching engine which is responsible for maintaining the order book in the exchange for a particular security. For example information 244 indicates that securities 246 starting with the letter A or B corresponding to a multicast matching engine group which are members of a multicast group which listens to multicast address 1. In addition information 244 indicates that securities 250 starting with the letter X, Y or Z corresponding to a multicast matching engine group which are members of a multicast group which listens to multicast address Q 252.

In addition to the security to multicast address mapping information 244, the gateway 200 can, and does include in some embodiments, information mapping a security to a particular matching engine. Such information can be accessed and the identifier corresponding to the matching engine corresponding to a particular security can be included in a multicast transaction message generated by the gateway 200 when the multicast transaction message relates to an order corresponding to a particular identified security.

Multicast transaction messages generated by the gateway 200 may be of the type illustrated in FIG. 8. Generated multicast transaction message 256 is a first multicast transaction message transaction message generated by a message generation module in the assembly of modules 222. The multicast transaction message 256 includes a first multicast address as a destination address and at least some information included in said received transaction message 220. In some embodiments the gateway 200 selects, for use as the destination address, a multicast address from a plurality of multicast addresses based on a securities identifier included in the received transaction message 220. In accordance with various embodiments, the generated multicast transaction message 256 is transmitted, e.g., multicasted, from the gateway 200 to multiple members of a first multicast group corresponding to the selected multicast address that was used as a destination address in the multicast transaction message 256.

The received multicast transaction response message 258 is a multicast transaction response message received in response to the multicast transaction message 256 which was transmitted by the gateway 200.

The unicast transaction response message 260 is generated by a message generation module in the assembly of modules 222, from the received multicast transaction response message 258. In various embodiments a transmitter included in the interface 210 is configured to transmit the unicast transaction response message 260 to a trader or broker from which the transaction message 220 was received. In various embodiments the unicast transaction response message 260 is an order response message addressed to the broker system or client system from which unicast transaction message 220 was received.

Figure 2A:
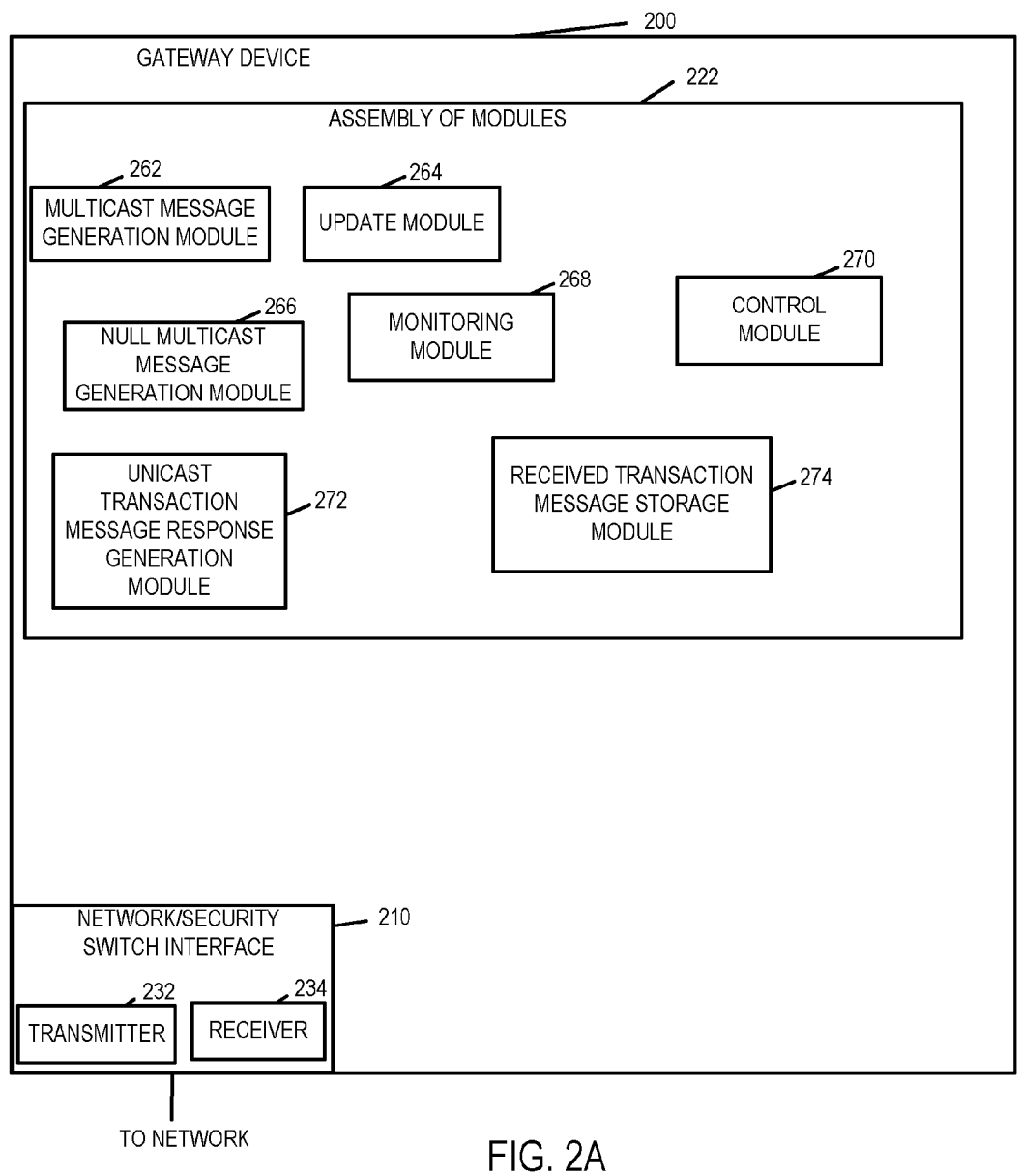
FIG. 2A illustrates in greater detail, parts of the exemplary gateway device of FIG. 2, including an assembly of modules which may be used in the gateway device, in accordance with various embodiments.

FIG. 2A illustrates a portion of the exemplary gateway device 200 of FIG. 2 in greater details, in accordance with one exemplary embodiment of the invention. The assembly of modules 222 included in memory 212 is shown in FIG. 2A in greater detail than in FIG. 2 as is the network/security switch interface 210. The other components of the gateway 200 not shown in FIG. 2A but shown in FIG. 2 would also be part of the gateway of FIG. 2A but are omitted from the figure to provide room to show some of the gateway elements in greater detail. The network/security switch interface 210 is also shown in FIG. 2A in greater detail. The interface includes a transmitter 832 and a receiver 834. The receiver 834 is configured to receive a first transaction message, e.g., received transaction message 220. The transmitter 832 is configured to transmit said first multicast transaction message, e.g., message 256. In some embodiments the receiver 834 is further configured to receive a first multicast transaction response message 258 in response to said first multicast transaction message 256.

The modules in the assembly of modules 222 can be implemented in hardware within the processor 208 of FIG. 2, e.g., as individual circuits. Alternatively, the modules may be implemented in software and stored in the memory 212 of the gateway 200 shown in FIG. 2. While shown in the FIG. 2 embodiment as a single processor, e.g., computer, it should be appreciated that the processor 208 may be implemented as one or more processors, e.g., computers.

When implemented in software the modules include code, which when executed by the processor, configure the processor, e.g., computer, 208 to implement the function corresponding to the module. In some embodiments, processor 208 is configured to implement each of the modules of the assembly of modules 222. In embodiments where the assembly of modules 222 is stored in the memory 212, the memory 212 is a computer program product comprising a computer readable medium comprising code, e.g., individual code for each module, for causing at least one computer, e.g., processor 208, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 2A control and/or configure the gateway 200 or elements therein such as the processor 208, to perform the functions of the corresponding steps illustrated and/or described in the exemplary methods of the present invention.

Assembly of modules 222 includes a multicast message generation module 262 configured to generate a first multicast transaction message including a first multicast address as a destination address and at least some information included in said first transaction message. In some embodiments the first transaction message is a unicast transaction message.

In some embodiments the multicast message generation module 262 is further configured to select, for use as said destination address, a multicast address from a plurality of multicast addresses based on a securities identifier included in the first transaction message. In some embodiments the multicast message generation module 262 is further configured to include, in the said first multicast transaction message, a multicast group identifier corresponding to a multicast group to which said first gateway device corresponds.

In some embodiments the multicast group identifier is a multicast address corresponding to said multicast group to which said first gateway device corresponds. In some embodiments the multicast message generation module 262 is further configured to include, said multicast address corresponding to said multicast group to which said first gateway device corresponds, as a source address in said first multicast transaction message.

The assembly of modules 222 further includes an update module 264 configured to update a multicast message counter value corresponding to the selected multicast address. In some embodiments the multicast message generation module 262 is further configured to include the updated multicast message counter value in said first multicast transaction message.

The assembly of modules 222 further includes a null multicast transaction message generation module 266 configured to generate a null multicast transaction message including an updated message count at predetermined time intervals. In some embodiments the transmitter 832 is further configured to transmit said null multicast transaction message.

The assembly of modules 222 further includes a monitoring module 268 configured to monitor a time lapsed since a last multicast message was sent to said selected multicast address, and a control module 270 configured to control the transmitter 232 to transmit, if said lapsed time reaches a maximum time between multicast messages threshold, a null multicast transaction message to said selected multicast address, said null multicast transaction message including an updated multicast message counter value. The assembly of modules 222 in some embodiments further includes a received transaction storage module 274.

In some embodiments the transmitter 232 is configured to transmit the first multicast transaction message to a switch used to communicate said multicast transaction message to multiple members of a first multicast group corresponding to the selected multicast address that was used as a destination address in the first multicast message, said multicast transaction message including at least some information included in said first unicast transaction message.

In some embodiments the first multicast response message includes a destination address which is the same as a multicast address included in said first multicast transaction message as a source address.

In some embodiments the assembly of modules further includes a unicast transaction response message generation module 272 configured to generate a first unicast transaction response message from the first multicast response message. In some embodiments the transmitter 232 is further configured to transmit said first unicast transaction response message to a trader or broker from which said first unicast transaction message was received. In various embodiments the first unicast transaction response message is an order response message addressed to the broker system or client system from which said first unicast transaction message was received.

In some embodiments the first multicast address corresponds to a first multicast group including the first matching server and a second matching server. In some embodiments the first multicast group further includes a transaction message logging device. In some embodiments the first multicast transaction response message includes a multicast address as a message source address, the multicast address corresponding to a multicast group including a matching server which performed a matching operation in an attempt to complete an order communicated by said first multicast transaction message. In some embodiments the said first and second multicast groups further includes a market data server used for distributing public order information.

Figure 3:
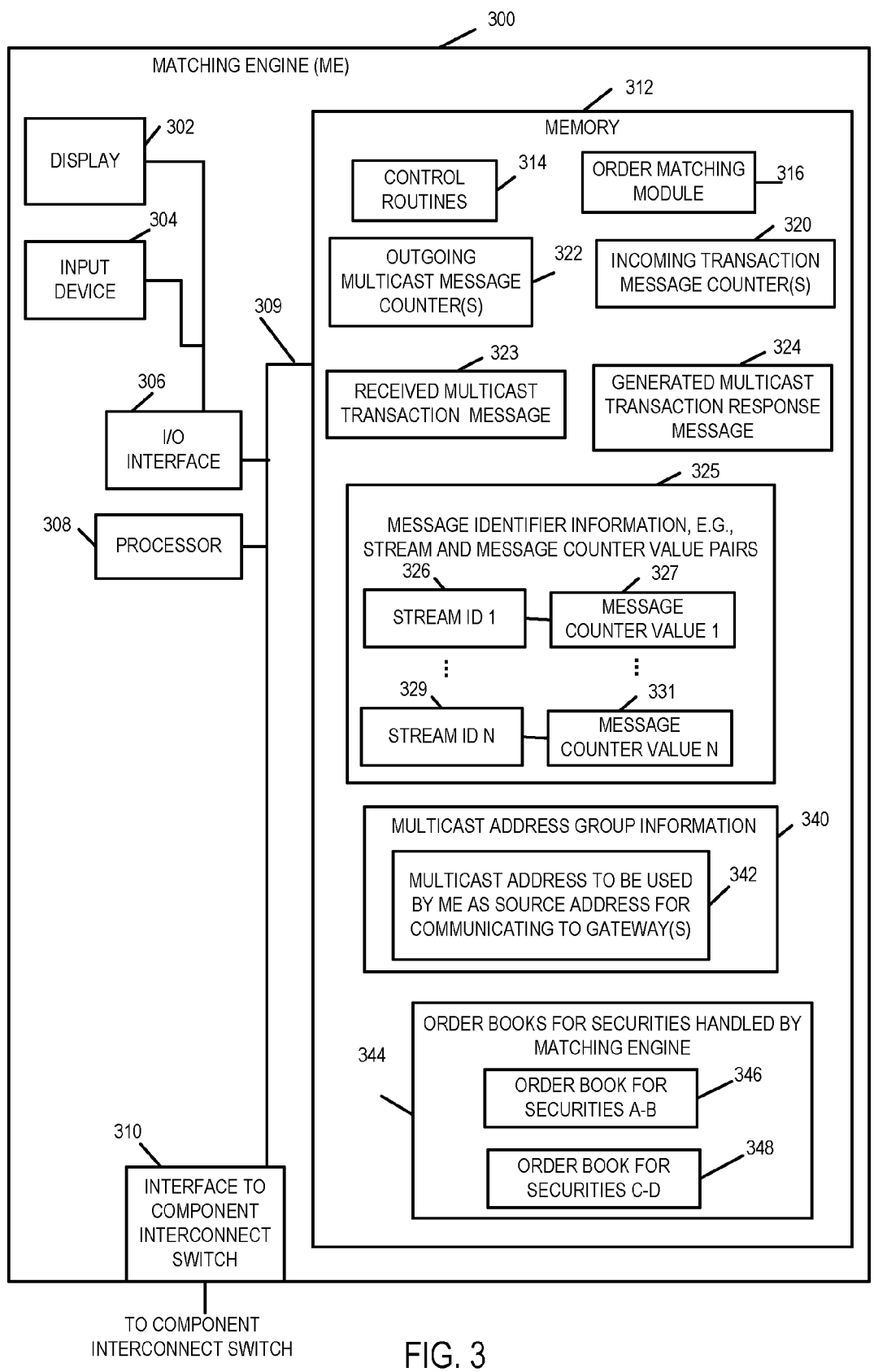
FIG. 3 is a drawing of an exemplary matching engine (ME) in accordance with an exemplary embodiment.

FIG. 3 illustrates an exemplary matching engine (ME) 300 in accordance with various exemplary embodiments. The matching engine 300 is, e.g., any one of the matching engines (146, 148, 150, 152) of system 100 of FIG. 1. Exemplary matching engine 300 includes a display 302, an input device 304, an I/O interface 306, a processor 308, a component interconnect switch interface 310 and a memory 312 coupled together via a bus 309 over which the various elements may interchange data and information. The I/O interface 306 is coupled to the display 302 and the input device 304, e.g., keyboard, keypad, mouse, etc. The transmission and reception through the interface 310 is controlled under the direction of the processor 308 which executes one or more of the routines and/or modules included in memory 212 to control the operation of matching engine 300.

The matching engine 300 performs the matching operation on trade/transaction orders. The matching engine 300 maintains an order book to keep track of various trades, stocks, shares etc., on the exchange market that are available for trading, check if a match is available corresponding to a trader's trade order, e.g., a trade order requested in a transaction message from a trader system. For example, if a received trade order indicates that a trader is looking to buy 100 shares from a certain company X, the matching engines 218, 218' look for shares from company X that are available for buying. If there is a match, the trade order can be performed and the transaction corresponding to the trader requested trade order may be completed.

The memory 312 includes control routines 314, an order matching module 316, incoming transaction message counter(s) 320, an outgoing multicast message counter(s) 322, stream and message counter value information 324, multicast address group information 340, and order book for securities handled by the matching engine 344. The processor 308, e.g., a CPU, may execute the routines 314 and various modules, and use the data/information in memory 312 to control the operation of matching engine 300 in accordance with the invention.

In accordance with various embodiments, the matching engine 300 receives a transaction message, e.g., a multicast transaction message, from the gateway device 200. In accordance with one feature, the matching engine 300 performs a matching operation using the information indicated in the received multicast transaction message.

The incoming transaction message counter 320 keeps track of the incoming, e.g., received transaction messages, while the outgoing message counter 322 keeps track of the outgoing messages, e.g., transaction response messages communicated from the matching engine 300.

The received transaction message 323 is a transaction message received by the matching engine 300 from the gateway 200. In various embodiments the received transaction message is a multicast transaction message communicated from the gateway 200. The generated multicast transaction response message 324 is a multicast transaction response message generated by the matching engine 300 for communicating to one or more gateway devices, e.g., gateway 200.

The stream and message counter value information 325 includes stream identifier (ID) and message counter value pairs for a plurality of streams including stream ID1 326 and message counter value 1 327 pair, . . . , and stream ID N 329 and message counter value N 331 pair. The stream and message counter value of an individual pair can, and in some embodiments is, used a message identifier. Some of the stored stream and message counter pairs may serve as message identifiers corresponding to streams being received by the matching engine and may represent the message identifier which was last received in a message corresponding to the identified stream. Other ones of the stored stream and message counter pairs may serve as message identifiers corresponding to streams being transmitted by the matching engine and may represent the message identifier which was last transmitted in a message corresponding to the identified stream.

The multicast address group information 340 includes the multicast address 342 to be used by the matching engine 300 as a source address for communicating information to one or more gateway devices, e.g., gateway 200. The order books for securities handled by matching engine 344 includes order book for securities A-B 346, order book for securities C-D 348. The order books list the valid orders, e.g., buy orders and sell orders, for the security listed in the order book. If a buy and sell order are found to match, the matching engine 300 generates and sends separate multicast transaction reply messages to notify the buyer and seller of the extent to which their orders were completed. The exchange will normally send an acknowledgement message if it places an order on the order book which can not be immediately completed.

Figure 4:
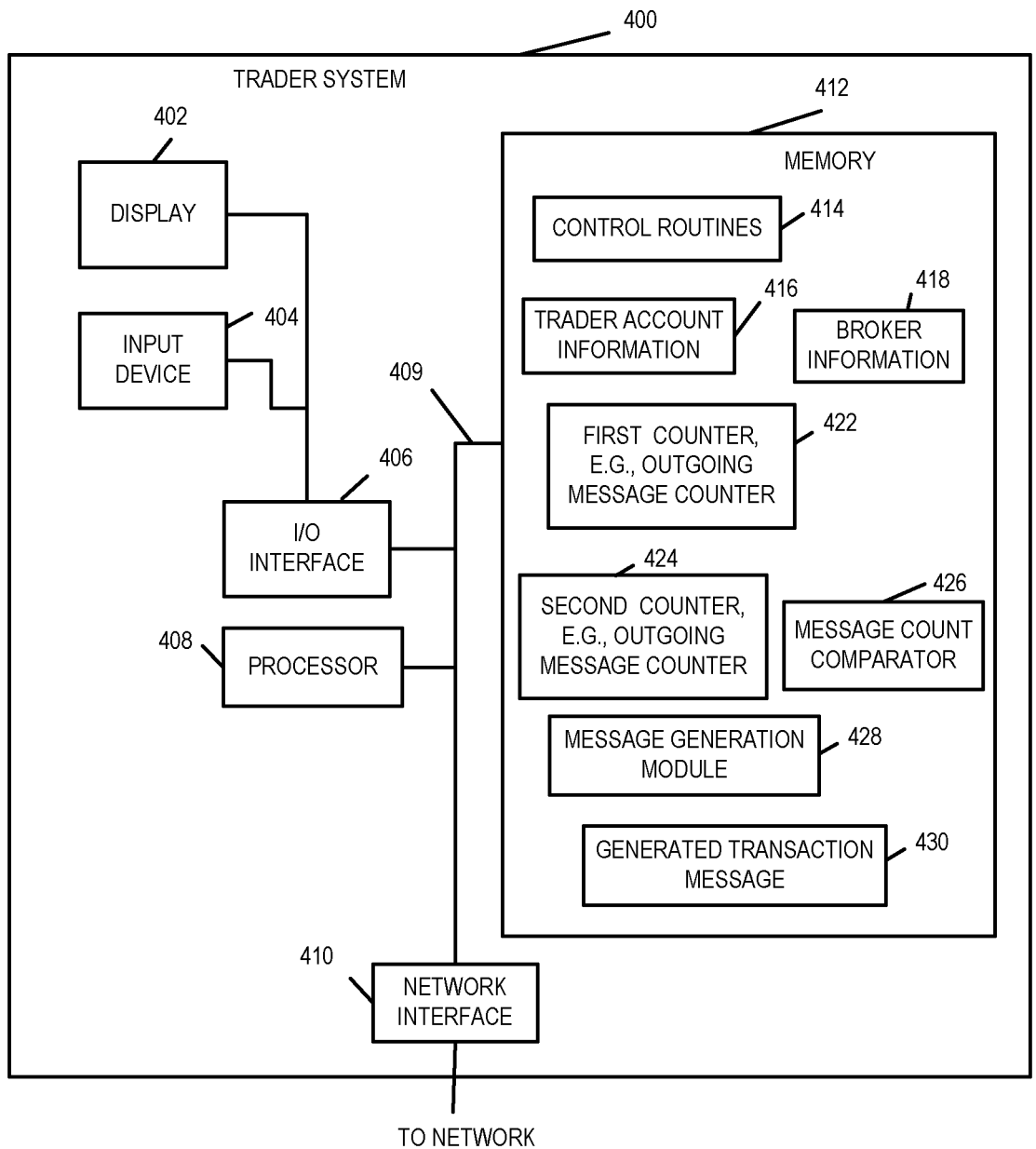
FIG. 4 illustrates an exemplary trader system implemented in accordance with some exemplary embodiments.

FIG. 4 illustrates an exemplary trader system 400, in accordance with one exemplary embodiment. The trader system 400 may be used as any one of the trader systems 112 through 118 shown in FIG. 1. As illustrated, the trader system 400 includes a display 402, an input device 404, an I/O interface 406, a processor 408, a network interface 410, and a memory 412 coupled together by a bus 409.

The input device 404 is, e.g., keyboard, keypad, mouse, etc. The network interface 410 in some embodiments includes a receiver and a transmitter. Via the network interface 410 the trader system 400 can receive and/or send information including, e.g., transmit transaction messages, receive transaction response messages etc. The network interface 410 includes the receiver which is responsible for receiving and processing information, e.g. transaction response messages, risk check failure messages etc. The transmitter module included in the network interface 410 is responsible for generating and sending signals and/or other information. The transmission and reception through the network interface 410 is controlled under the direction of the processor 408 which executes one or more of the routines and/or modules included in memory 412.

The memory 412 includes trader system control routines 414 which control overall trader system operation in accordance with the invention. Control routines 414 may operate in conjunction with various modules which are used to perform various functions. The memory 412 includes trader account/identification information 416, client information 417, broker information 318, generated transaction message 420, a first counter 422, a second counter 424, and a message count comparator 426.

The trader account/identification information 416 in some embodiments includes a trader identifier. A trader identifier identifies the trader and/or trader system to which the transaction, e.g., order, message corresponds. Client information 417 includes information regarding one or more clients with which the trader has relationship and that the trader system 400 uses for performing trades, e.g., for placing trade orders using the client's system. Broker information 418 includes information regarding one or more broker systems with which the trader has relationship and that the trader system 400 may use for performing trades, e.g., buying/selling stocks. Broker information includes broker identifiers corresponding to various different brokers systems. A broker identifier is an identifier of a broker which is responsible for backing the trade order placed by the trader system 400, e.g., guaranteeing that the order will be honored and, in some cases, making sure that the trader complies with various trading rules implemented by the applicable government and/or ECN management.

The first counter 422 keeps track of the outgoing transaction messages during each trading session. The second counter 424 keeps track of the incoming messages, e.g., transaction acknowledgment and transaction response messages, response messages etc., during each trading session. The message count comparator 426 is configured to compare incoming and outgoing transaction message count and determine if there are one or more messages that may have been missed. In some embodiments the message comparator 426 provides information regarding missing/lost transaction messages to the processor 408.

The generated transaction message 430 is e.g., an order message, generated by the transaction message generation module 428. The transaction message 430 may, and in some embodiments does, include information such as, for example, a trader identifier, a broker identifier (or combined broker-client identifier), a message number in addition to order or other trade information such as a securities identifier, price information, time period for which the order is to remain in effect and/or an indicator indicating the particular type of order, e.g., buy, sell or limit. Depending on the embodiment some of the information may be omitted. The trader identifier identifies the trader and/or trader system to which the transaction, e.g., order, message corresponds. The broker identifier or combined broker-client identifier is an identifier of a broker and/or broker client combination. The identified broker is responsible for backing the order, e.g., guaranteeing that the order will be honored and, in some cases, making sure that the trader complies with various trading rules implemented by the applicable government and/or exchange management. One or more traders may work and place order on behalf of a client. In such a case, a trader identifier is often included in the transaction message in addition to the broker-client identifier information. The message number is a unique number that is different for each message sent during a trading session by a trader from which the transaction message is received. The message number is incremented after each message is sent so that messages from the same trader will bear sequential numbers and lost messages can be readily detected and requested from the trader system and/or a message logging system. The securities identifier identifies a stock or other item or financial instrument to which the transaction message relates. The message type information indicates the type of message being communicated. The message type may indicate one of a variety of different order types and provide price, quantity and/or duration information relating to the order being communicated. The transaction message may also be an order cancelation type and provide information indicating what previous order that was placed by the trader sending the message is to be canceled.

The transaction messages are transmitted by trader system 400 to an exchange system, e.g., exchange system 110 where they are received and processed by the gateway, e.g., gateway device 200, in accordance with various embodiments.

Figure 5:
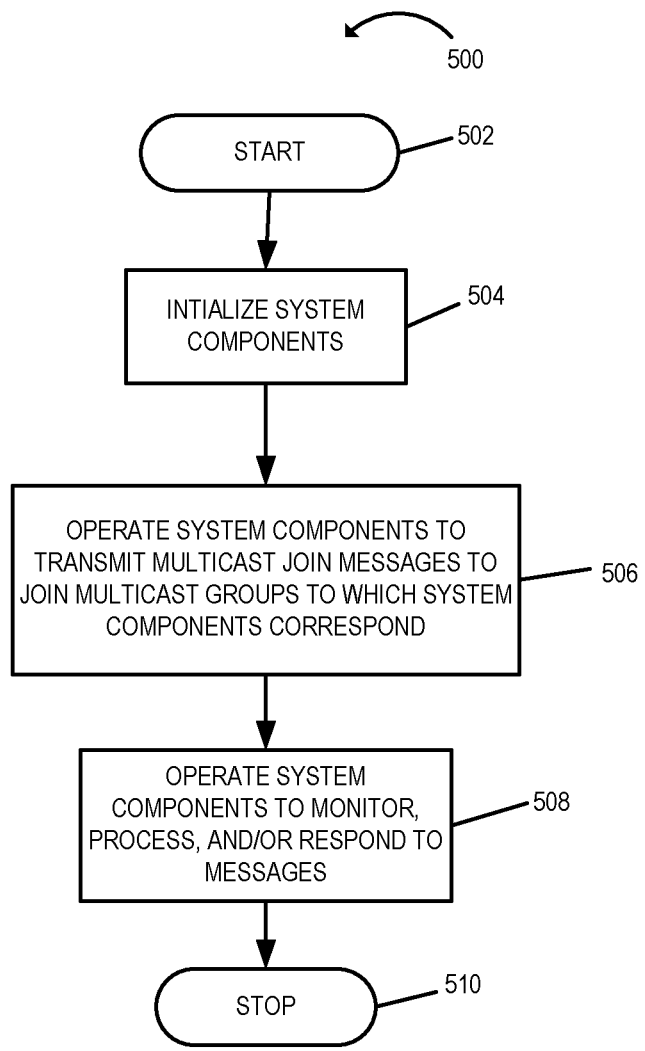
FIG. 5 is a flowchart of an exemplary method of operating an exchange system in accordance with various embodiments.

FIG. 5 is a drawing of an exemplary assembly of modules 500 in accordance with various embodiments. Assembly of modules 500 is, e.g., included in routines 414 of memory 412 of gateway 400 of FIG. 4. Assembly of modules 500 includes a module for receiving a session login 504, a module for providing a client device to exchange system message sequence number to a client device 506, a module for providing an exchange system to client device message sequence number to a client device 508, a module for receiving a client to exchange system message form a client device 510, and a module for checking a received client to exchange system message to determine if it includes an expected client device to exchange system message sequence number 512. Assembly of modules 500 further includes a module for controlling operation as a function of the determination of the checking of the received client to exchange system message as to whether it includes the expected client device to exchange system message sequence number 514, a module for rejecting a received client to exchange system message in response to a determination that it does not include the expected client device to exchange system message sequence number 516, a module for notifying ac client device of the rejected client to exchange system message 518, a module for accepting a received client to exchange system message in response to a determination that it does include the expected client to exchange system message sequence number 520, and a module for incrementing the expected client device to exchange system message sequence number following acceptance of a client to exchange system message 522. Assembly of modules 500 further includes a module for sending at least a portion of an accepted client to exchange system message to a matching engine 524, a module for receiving a response to a message from a matching engine 526, a module for transmitting a first exchange system to client device message including said exchange system to client device message sequence number to said client device 528, a module for incrementing said exchange system to client device message sequence number to generate an updated exchange system to client device message sequence number 530, and a module for sending an additional exchange system to client device message to said client device, said additional exchange system to client device message including said updated exchange system to client device message sequence number 532. Assembly of modules 500 further includes a module for maintaining a current client device to exchange system message sequence number for each of a plurality of client devices 534 and a module for maintaining a current exchange system to client device message sequence number for each of a plurality of client devices.

FIG. 5 is a high level flow chart illustrating an exemplary method 500 of operating an exchange system, e.g., exchange system 100, to support transactions, e.g., completion of orders by matching by and sell orders, using multicast messaging in accordance with one exemplary embodiment.

The method starts in step 502 and in step 504 the system components are powered up and initialized. The system components, after being initialized in step 504 transmit multicast join messages to make the component interconnect switch 126 aware of their presence in the system. The component interconnect switch 126, which may be implemented using a conventional switch which supports multicast messaging, generates and stores multicast group information and, in some cases, acknowledges the multicast join messages transmitted to the switch by the individual devices, e.g., gateways 138, 140, 142, 144, control device 132. message logging system 134, market data communications system 136, and matching engines 146, 148, 150, 152. Based on the received join messages, the switch creates a table of routing information so that the switch knows which ports on the interconnect switch 126 have which group members attached. Thus, when a message directed to a multicast address is received, the interconnect switch has the necessary information to determine which ports a received multicast message should be transmitted out on. For example, if a multicast transaction message is received by switch 126 addressed to a multicast address to which matching engines 146, 148 belong in addition to the control device 132, message logging system 134 and market data system 136, the switch will replicate the received multicast message and output it on each of the switch ports to which one of the multicast group members 146, 148, 132, 134, 136 is attached.

In step 508 the system components are operated to monitor, process and/or respond to messages. As part of this process of ongoing operation, the component interconnect switch will receive and process multicast messages including new join messages transmitted by devices entering the system. For example, if a an additional or replacement matching engine corresponding to a multicast group is added it will send a multicast join message to the switch 126 so that the switch can update its routing table. The message logging system 134, which may include multiple message storage components corresponding to different multicast addresses, may, and in various embodiments will, respond to receiving a multicast message by updating a message log corresponding to the multicast source and/or destination address to that the log includes the received multicast transaction message. The message logging system 134 will also respond to multicast message back fill requests by transmitting the messages requested to a multicast address, e.g., the multicast address from which the request was received. Devices in the system may then update their internal message logs based on the multicast backfill messages.

In addition to transmitting a multicast join message to the component interconnect switch a newly added monitoring device can, and in some embodiments does, transmit a multicast message back fill message requesting messages it needs to bring its internal message records up to date. The message logging system 134 will respond as noted above by multicasting the requested messages. Thus, a component added to the system 110, whether as part of a replacement operation or to add new monitoring functionality can be easily updated and provisioned as part of the normal process of devices requesting and receiving message backfill to complete their internal message logs and/or system information.

Since devices can join and leave multicast groups without requiring changes in the multicast addresses through the use of simple multicast group management techniques, complicated address configuration changes when devices are added to or removed from the system 100 are avoided.

As part of operating components to monitor, process and/or respond to messages performed in step 508, a client gateway device such as device 138, corresponding to a multicast gateway group 122, may receive and process transaction messages from a client, e.g., trader system, and respond to the messages as will be discussed further with reference to FIG.

6. While an exchange 100 may close for trading, a session with a trader may continue over many days and the system state, e.g., messages and message counters is maintained for the duration of the session.

Operation of the exchange system 100 continues until it is stopped, e.g., in step 510 by, e.g., shutting down the exchange.

Figure 6C:
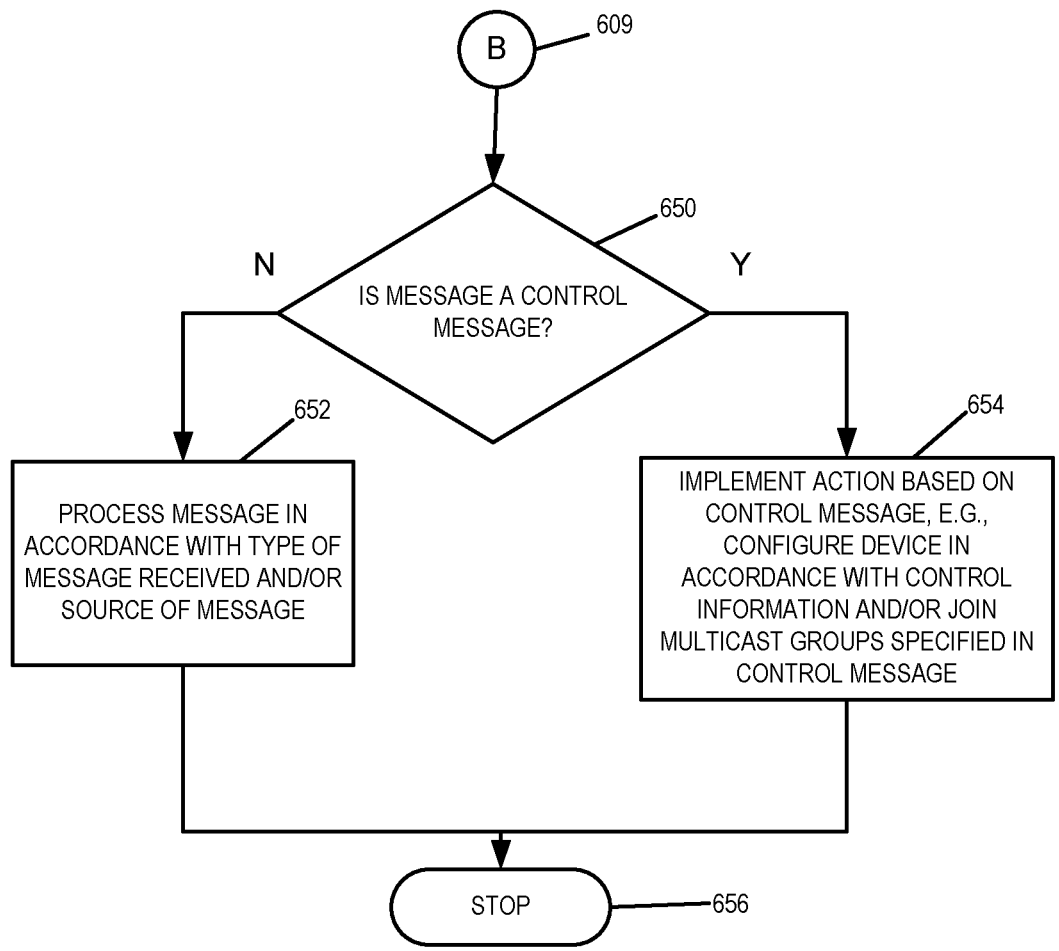
FIG. 6, comprising the combination of FIG. 6A, FIG. 6B and FIG. 6C, is a flowchart of an exemplary method of operating a gateway device in accordance with an exemplary embodiment.
Figure 6:
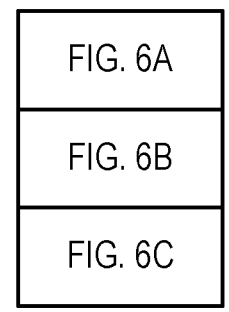

FIG. 6, which comprises the combination of FIGS. 6A and 6B, shows the steps of a method 600 implemented by a client gateway, e.g., gateway 138 of gateway group 122 for example, relating to message handling. For purposes of explaining the exemplary method 600 it will be assumed that the method is implemented by the gateway 138. However, it should be appreciated that each of the client gateways in the system implement the same or a similar method in some embodiments.

The method 600 normally starts in step 602 after the gateway has already joined the one or more multicast groups to which it belongs by sending join messages to the switch 126. Operation proceeds from start step 602 to step 604 in which the client gateway 138 monitors for and receives a message. The received message may be, e.g., a transaction message from a client system such as trader system 112, a multicast transaction response message from a matching engine such as ME 146 or some other type of message such as a control or configuration message, e.g., from control device 132. An exemplary transaction message may be, e.g., a unicast order message from trader system 112. The unicast order message may include, as a destination address, a unicast address of a gateway serving the first client 102, e.g., a unicast address corresponding to gateway 138. However, the transaction message need not be limited to a unicast destination address and may instead use a multicast address corresponding to a gateway group, e.g., gateway group 1, 122. The transaction message from a trader system 112 normally includes a broker and/or client identifier and may also include a trader identifier where a client has multiple traders working for the client. The transaction message may also include other information, e.g., order information. The order information normally identifies a security to be traded, e.g., brought and/or sold, and other information such as price per share and/or the number of shares to be traded. The transaction message from the trader system may also include additional transaction information, e.g., a client order identifier used to identify the particular order and/or information on the duration the order is to remain valid, e.g., maintained on an order book maintained by a matching engine 146 if the order can not be completed immediately because there is not a matching order, e.g., offer for sale, on the transaction book corresponding to the security identified in the transaction message.

Figure 9:
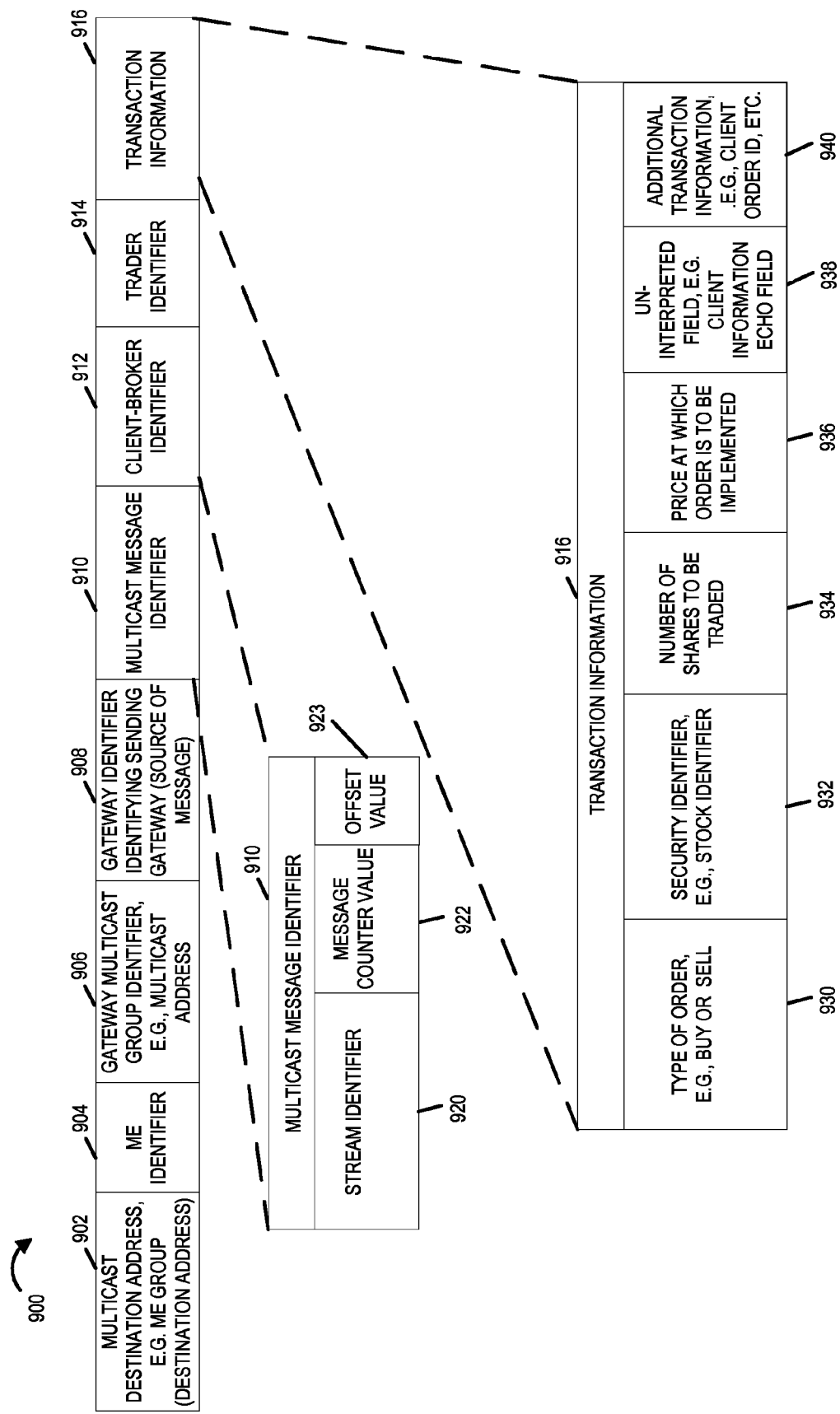
FIG. 9 illustrates an exemplary multicast transaction message, e.g., communicated within an exchange system, in accordance with an exemplary embodiment.

The message received in step 604 may also be a response to a transaction message, e.g., a multicast transaction response message received from a multicast engine which is responsible for maintaining the order book for the security to be traded. An exemplary multicast transaction response message is shown in FIG. 9. A multicast transaction response message may include a multicast address corresponding to the multicast group 128 to which the matching engine which generated the multicast transaction response message corresponds. The multicast transaction message also normally includes as a destination address the multicast address used by the gateway which transmitted a multicast transaction message to which to which the response message corresponds. A multicast message identifier generated by the sending multicast engine is also normally included in the multicast transaction response message. Various fields and content included in the exemplary multicast transaction message 900 shown in FIG. 9 will be discussed below after a discussion of an exemplary multicast transaction message 800.

Operation proceeds from step 604 in response to a message being received by the gateway device 138 to step 606 in which a determination is made as to whether the received message is a transaction message, e.g., originating from a device such as a trader system that is located external to the exchange system. The transaction message maybe, e.g., a unicast transaction message from trader system such as trader system 112. An exemplary unicast transaction message which can be received from a trader system 112 is shown in FIG. 8.

As shown the unicast transaction message 800 may include various information such as a gateway identifier 802, e.g., a gateway unicast address which identifies the particular gateway, e.g., gateway 138, which is the intended destination of message 800. Unicast transaction message 800 also includes a trader system address 804 which is the source address of message 800, e.g., an address of trader system 112.

In addition to the source and destination information, the unicast transaction message 800 also includes a message identifier 806. The message identifier 806 can be used to identify the message and distinguish it from other unicast transaction messages in the system. In some but not necessarily all embodiments, the unicast message identifier 806 includes a stream identifier portion 820 and a message counter value 822. The message identifier 806 may also include, optionally, an offset value indicating the offset 823 added to the counter value of the last transaction message sent in the identified stream. The offset value allows incrementing of the counter value by more than one or some non-uniform amount while still allowing a receiving device to accurately generate an expected message counter value from the last message in the identified stream by adding the offset value to the counter value included in the last received transaction message obtained from the identified stream. This allows a receiving device to determine if it is missing any messages whether the message counter value is incremented by the same or different amounts from one message to the next.

In combination the elements of the message identifier field 806 can identify the unicast message to the trader system, gateway, as well as other devices in the system such as a message logging system 134. The stream identifier 820 may identify the stream within the system to which the message identifier corresponds. Streams corresponding to different source and destination devices may be treated as different streams. In some embodiments, streams are defined to the level of an individual stream with an individual stream being between a particular trader system and the particular ME to which an order may be forwarded. Thus, transaction messages from a trader corresponding to different stocks which are handled by different MEs may be treated as different streams. Transaction response message streams may also be defined to a similar level with response messages from different MEs to a trader being treated, at least in some embodiments, as different ME to trader streams. For each stream a different message counter may be maintained. During a session messages corresponding to a stream will normally have their message counter values updated with the sending of each new message. In some embodiments, the message counter value is initially provided by the exchange system, e.g., an ECN, and updated for subsequent messages. Thus, the message identifier 806 can be used to reliably identify a particular message in the exchange system. A device seeking a message gap fill may indicate the messages it wants provided by providing a range of message identifiers. In some embodiments, the gap fill request message includes a stream identifier and a range of corresponding message counter values which in combination identify a set of messages to be provided in response to the gap fill message.

Referring once again to message 800, the unicast transaction message 800 may also include a client-broker identifier 808 and/or a trader identifier 810. The client-broker identifier 808 identifies the client and/or broker to which the transaction message 800 corresponds. Separate values may be used as a client identifier and a broker identifier or a single value with a known mapping to a client and broker may be included in the client-broker identifier field. Message 800 may include various types of transaction information 812. The transaction information 812 may include, e.g., order type information 830 indicating the type of order the transaction message is communicating, a security identifier 832 identifying a security to which the order relates, a number 834 of shares to be traded, price information 836 indicating the price, e.g., on a per share basis, at which the order is to be implemented, un-interpreted field information 838, e.g., client information echo field information, and/or additional transaction information 840 such as a client order identifier sometimes referred to as an order token which may be used to identify the order and may be included in response messages corresponding to the order.

If the received message is a transaction message from an external device, e.g., trader system 112, operation proceeds to step 612. In step 612 the gateway 138 generates a multicast transaction message from the received transaction message. Generating a multicast transaction message from a received transaction message includes one or more, and in some embodiments all, of steps 613, 614, 616, 618, 619 620, 622, and 624 as shown in FIG. 6A.

An exemplary multicast transaction message 900 which may be generated from a received transaction message, e.g., a unicast transaction message from a trader system 112, is shown in FIG. 9. An exemplary multicast transaction message 900 which may be generated from a received transaction message, e.g., a unicast transaction message, e.g., message 800, from a trader system 112, is shown in FIG. 9. As shown the multicast transaction message 900 may include various information such as a multicast address 902 which is used as a message destination address. The multicast destination address corresponds to a group of matching engines where one of matching engines in the group is known to be responsible for handling the order book for a security, identified in the received transaction message. The multicast transaction message 900 also includes a matching engine identifier 904 identifying the specific matching engine responsible handling the transaction requested in the transaction message, e.g., a matching engine which handles the order book for the identified security to be traded. Thus, while a multicast address is used as the destination address of the message 900 the message includes information identifying a specific matching engine entity to which the message is intended to be delivered to. Based on the ME identifier 904, a receiving matching engine is able to determine whether or not it is to process and/or respond to the message addressed to the matching engine group identified by the address in field 902.

The multicast transaction message 900 also includes a gateway multicast group identifier 906 corresponding to a multicast group to which the sending gateway belongs. The multicast group identifier 906 may be, e.g., a multicast group address corresponding to a gateway group. In addition to the gateway multicast group identifier 906, the message 900 includes a gateway identifier 908 identifying the particular gateway, e.g., gateway 138, sending the specific multicast transaction message. Thus, while the message 900 includes multicast group addresses corresponding to gateway and matching engine groups, it also includes information identifying the specific sending gateway entity and specific destination matching engine. Thus, while multicast addressing is used, the message includes sufficient information to identify a specific sending gateway, e.g., gateway 138 and a specific destination matching engine, e.g., ME 146. In addition to the source and destination information, the multicast transaction message 900 also includes a multicast message identifier 910. The multicast message identifier 910 can be used to identify the message and distinguish it from other multicast transaction messages in the system. In one but not necessarily all embodiments, the multicast message identifier 910 includes a stream identifier portion 920 and a message counter value 922. In combination these elements can identify the multicast message to the gateway, ME as well as other devices in the system such a message logging system 134. The message identifier 910 may also include, optionally, an offset value indicating the offset 923 indicating the offset added to the counter value of the last multicast transaction message sent in the identified stream. The offset value allows incrementing of the counter value by more than one or some non-uniform amount while still allowing a receiving device to accurately generate an expected message counter value from the last message in the identified stream by adding the offset value to the counter value included in the last received transaction message obtained from the identified stream. This allows a receiving device to determine if it is missing one or more previous messages corresponding to the identified stream whether the message counter value is incremented by the same or different amounts from one message to the next. The multicast message counter value 922 may be the same as the unicast message counter value of the message to which it corresponds. However, in cases where multicast messages are incremented differently from unicast messages they may be different. Also, in some embodiments, NULL multicast transaction messages may be transmitted e.g., by the gateway devices in the exchange on a periodic or other basis to facilitate the rapid detection of the failure of a device to receive a communicated multicast message. In the case of a NULL multicast transaction message generated by a exchange system component, e.g., in response to a recurring timer expiring, the message counter value 922 will not correspond to a unicast transaction message but will still be higher than the last generated unicast transaction message for the stream identified in the message 900.

Where unicast transaction messages are incremented by an amount greater than 1, e.g., 2, NULL multicast transaction messages may, and in some embodiments are, generated by incrementing the last received unicast transaction message value by a value less than that used to increment the unicast transaction messages. The NULL transaction messages which do not include any transaction information facilitate the detection, at a receiving device, of a failure to receive a previously transmitted message and are useful as a fault detection mechanism in the exchange system. NULL transaction messages, and corresponding NULL response messages, are not transmitted outside the exchange system, e.g., to a trader system in various embodiments in which they are used.

The stream identifier 920 may identify the stream within the system to which the multicast message identifier corresponds. Streams corresponding to different source and destination devices may be treated as different streams. In some embodiments, streams are defined to the level of an individual stream with an individual stream being between a particular trader system and the particular ME to which an order may be forwarded. Thus, transaction messages form a trader corresponding to different stocks which are handled by different MEs may be treated as different streams. Transaction response message streams may also be defined to a similar level with response messages from different MEs to a trader being treated, at least in some embodiments, as different ME to trader streams. For each stream a different message counter may be maintained. During a session, messages corresponding to a stream will normally have their message counter values updated with the sending of each new message. Thus, the multicast message identifier 910 can be used to reliably identify a particular message in the exchange system. A device seeking a message gap fill may indicate the messages it wants providing a range of multicast message identifiers. In some embodiments, the gap fill request message includes a stream identifier and a range of corresponding message counter values which in combination identify a set of messages to be provided in response to the gap fill message.

Referring once again to message 900, the multicast transaction message 900 may also include a client-broker identifier 912 and/or a trader identifier 914. The client-broker identifier 912 identifies the client and/or broker to which the transaction message 900 corresponds. This information may be obtained from a received unicast transaction message, e.g., message 800, from which the multicast transaction message 900 is generated. Similarly the message 900 may include various types of transaction information 916. The transaction information 916 may include, e.g., order type information 930 indicating the type of order the transaction message is communicating, a security identifier 932 identifying a security to which the order relates, a number 934 of shares to be traded, price information 936 indicating the price, e.g., on a per share basis, at which the order is to be implemented, un-interpreted field information 938, e.g., client information echo field information 938, and/or additional transaction information 940 such as a client order identifier sometimes referred to as an order token which may be used to identify the order and may be included in response messages corresponding to the order.

It should be appreciated that while the message 800 includes multicast group addresses corresponding to gateway and matching engine groups, it also includes information identifying the specific sending gateway entity and specific destination matching engine. Thus, while multicast addressing is used, the message includes sufficient information to identify a specific sending gateway, e.g., gateway 138 and a specific destination matching engine, e.g., ME 146.

In addition to the source and destination information, the multicast transaction message 800 also includes a multicast message identifier. The multicast message identifier can be used to identify the message and distinguish it from other multicast transaction messages in the system.

Referring once again to FIG. 6, as shown in step 612 of generating a multicast transaction message of the type shown in FIG. 9 may include the step 612 of identifying a machine engine corresponding to the security identifier included in the received transaction message and including the matching engine identifier in the multicast transaction message being generated. Step 612 also includes the step 614 of selecting a multicast address to be used as a destination address from a plurality of multicast destination addressed based on the securities identifier included in the received transaction message. Security to multicast address mapping information 244 may be used to support this operation with the multicast address, e.g., address 248, corresponding to the identified security, e.g., a security 246 starting with the letter A, being selected. Step 616 involves including the multicast address selected based on the identified security as a destination address of the multicast transaction message, e.g., by placing the selected multicast address in a destination address field 902 of the multicast transaction message being generated.

In addition to include the selected multicast address corresponding to an ME group in the multicast message being generated, in step 618 a multicast group identifier corresponding to the multicast group of gateway devices to which the gateway generating the message belongs is included in the multicast transaction message along with a specific sending gateway identifier included in the message in step 619. Thus, the generated multicast message includes information allowing the receiving multicast engine to identify the specific gateway from which the multicast transaction message was sent.

As part of generating the multicast transaction message a multicast message identifier is incremented in step 620. This may involve, e.g., incrementing, a multicast message counter value portion of a multicast message identifier so that messages corresponding to a particular stream can be distinguished from one another. While the updating involves a change to a multicast message identifier value it need not be an increment by 1 operation and may involve an increment by more than one or some other modification of the message identifier value so that it differs from previously used message identifier values for a particular message stream. The updated multicast message identifier is included in step 622 in the multicast transaction message which is generated.

In step 624 transaction information is included in the generated multicast message. This includes, for example, including order information obtained from the received transaction message and other information such as that already discussed with regard to exemplary transaction information 816. The transaction information may, but need not include, some information generated by the gateway generating the multicast transaction message.

Having generated the multicast transaction message from a received transaction, e.g., order, message operation proceeds from step 612 to step 626 in which the generated multicast transaction message is transmitted, e.g., sent to the to the component interconnect switch 126 for delivery to the devices, e.g., multicast engines 146, 148, 150, 152 and message logging system 134, which subscribe to the multicast address included in the generated transaction message as a destination address.

With the generation of at least one multicast transaction message operation proceeds to step 638 via connecting node A 628 which is followed by step 640. Steps 638 and 640 or performed on a periodic basis, e.g., at regular repeating time intervals and serve as a way of facilitating the detection by a receiving device that it did not receive one or more multicast messages from the gateway. In step 638 the gateway 138 generates a null multicast transaction message including an updated multicast message identifier for each stream being handled by the gateway implementing the method, e.g., gateway 138. Thus in at least some embodiments, a null transaction message is generated on a regular basis for each trader to matching engine stream being handled by the gateway. The null transaction message does not include any meaningful order information and is not generated from a transaction message received from a trader. In step 640 the generated null transaction messages are transmitted before operation returns to step 638 at the specified or predetermined interval.

Devices receiving the null message and the updated transaction message identifier included therein are able to compare the received updated transaction message identifier and determine if they received the previously transmitted multicast transaction messages corresponding to the same stream as the received null transaction message. Devices which determine that they did not receive multicast transaction messages based on the message identifier value included in a received multicast transaction message request, as will be discussed further below, the missing messages through the use of a multicast message gap fill request message. Responses to a gap fill request message are, in some embodiments, unicast messages with the unicast gap fill response messages supplying one or more of the requested missing messages.

Referring once again to FIG. 6A, if in step 606, it is determined that the message received by the gateway was not a transaction message, operation proceeds to step 608 in which the received message is checked to determine if it is multicast transaction response message. While a message type identifier may be included in a received message and used to facilitate identification of the message type, the message type can be determined from the format and/or fields included in the message in embodiments where a type identifier is not explicitly included in the received messages and is thus not available for use in making the message type determination. Before proceeding further with the description of FIG. 6, an exemplary multicast transaction response message will be explained with reference to FIG. 10.

Figure 10:
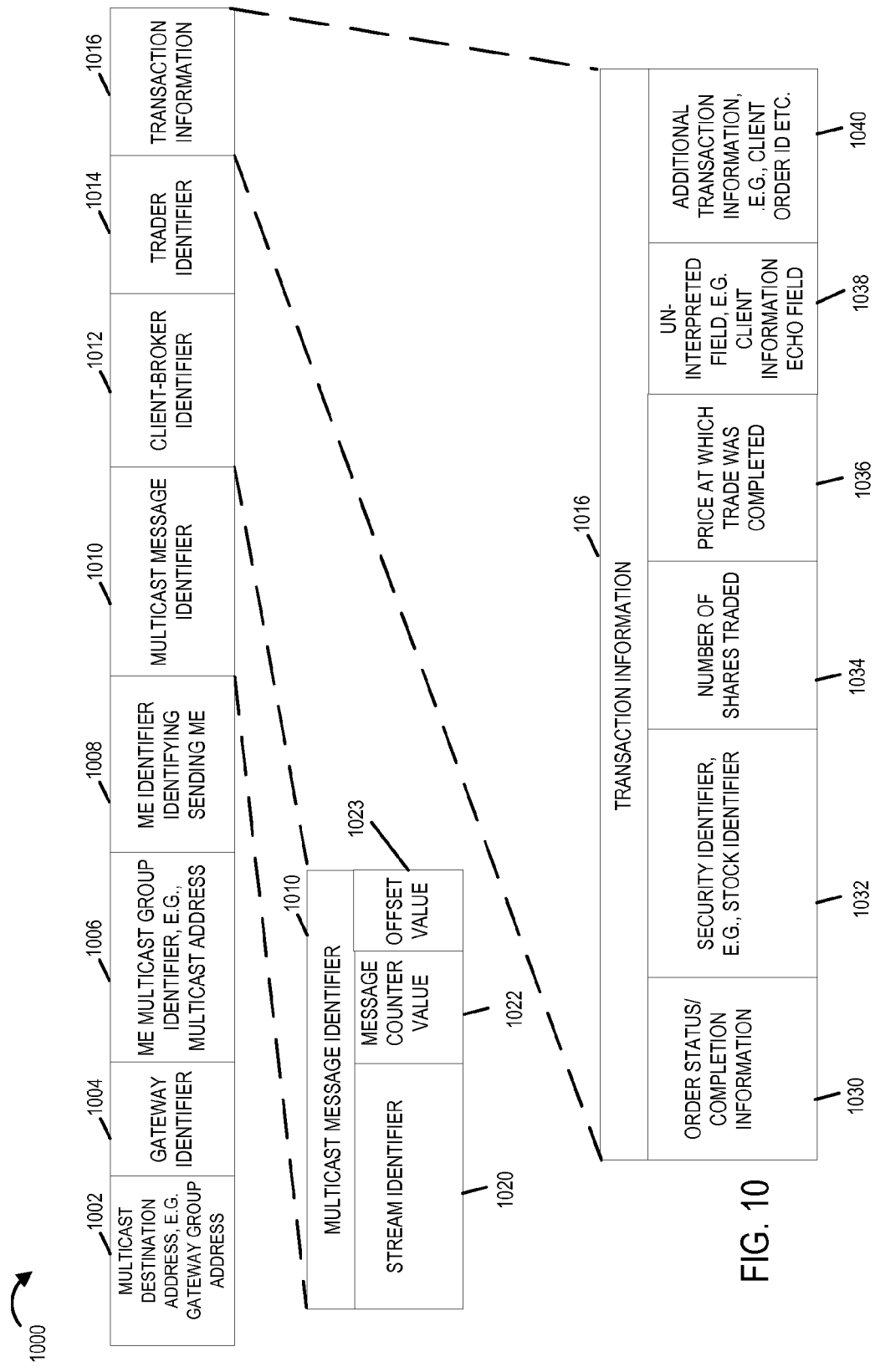
FIG. 10 illustrates an exemplary multicast transaction response message, e.g., communicated within an exchange system, in accordance with an exemplary embodiment.

FIG. 10 illustrates an exemplary multicast transaction response message 1000. The exemplary multicast transaction response message 1000 is similar in content and format to the multicast transaction message 900 which is already been described. The multicast transaction response message 1000 may, and in some embodiments is, generated and transmitted by a matching engine in response to a multicast transaction message 900 directed to the matching engine which generates message 1000 in response to the multicast transaction message 900.

The multicast transaction response message 1000 includes a multicast address 1002 as a message destination address. The multicast destination address 1002 will normally be the multicast address of the gateway group to which the gateway, that sent the transaction message being responded to corresponds. The message also includes gateway identifier 1004 which identifies the specific gateway which sent the transaction message to which response message 1000 corresponds. The information in fields 1002 and 1004 can, and in some embodiments are, obtained by the matching engine that generates message 1000 from multicast transaction message fields 906, 908.

Message 1000 also includes ME multicast group identifier 1006 which identifies a multicast group to which the sending matching engine is a member. The sending matching engine is specifically identified by matching engine identifier 1008 that is also included in message 1000. The message 1000 also includes a multicast message identifier 1010 which is generated by the matching engine sending the message. In some embodiments the multicast message identifier 1010 includes a stream identifier 1020 and a message counter value 1022. The multicast message identifier may also include an offset value indicating the increment added to the message counter value of the last multicast message corresponding to the identified stream to generate the current message counter value 1022 included in the message. Thus, the ME can increment the multicast messages corresponding to a stream by increments which may vary and/or be greater than a fixed number such as one. The inclusion of the offset value is optional and not used in all embodiments.

The stream identifier 1020 identifies a specific stream, e.g., a matching engine to trader stream. The message counter value 1022 is normally updated, e.g., changed, each time a message corresponding to the identified stream is sent by the matching engine.

In some embodiments the matching engine generates and sends null transaction response messages corresponding to streams that it is using to send messages on a periodic basis to facilitate detection of the failure to receive a multicast message at a gateway. The null transaction message will normally include a multicast message identifier which was updated relative to the last transaction response message of a stream to which the message corresponds allowing a receiving device to easily determine if any message were not received.

In addition to the multicast message identifier 1010, the multicast transaction response message 1000 includes a client-broker identifier 1012, trader identifier 1014 and/or transaction information 1016. Transaction information 1016, includes in some embodiments, order status and/or completion information 1030, a security identifier 1032, e.g., stock identifier, information on the number of shares traded 1034, information 1036 on the price at which the trades were completed, un-interpreted field information, e.g., client information echo field information 1038, and/or additional transaction information 1040 such as a client order ID which may be the same as the client order ID of the original trader transaction message 800 and multicast transaction message 900 generated by the gateway there from, to which the multicast transaction reply message 1000 corresponds.

Referring once again to FIG. 6A, if in step 608 it is determined that the message received by the gateway is not a multicast transaction response message, operation proceeds, via connecting node B 609, to step 650 shown in FIG. 6C. In step 650, the received message is checked to determine if it is a control message, e.g., a message sent by control node 132 to provide the gateway with configuration information, parameters and/or other information or commands. If the received message is a control message operation proceeds to step 654 in which an action is implemented based on the commands and/or information communicated by the control message. For example, in step 654 the gateway may make a configuration change based on control information received in the control message and/or join a multicast group specified in the control message. A control message may instruct a gateway in a multicast group to take over responsibility for messages, streams, clients and/or traders previously being handled by another gateway in the same multicast group as the gateway receiving the command. In such a case, the gateway receiving the command will begin handling multicast messages including the gateway identifier corresponding to the specific gateway for which the gateway receiving the message is to take over. Thus, gateways in a multicast group that can be specifically identified in a multicast message can be treated as logical entities with the physical gateway hardware corresponding to a gateway identifier being changed without the need to alter the address to which multicast messages are sent or even the gateway identifier being used by a matching engine at a particular point in time for a transaction message stream or transaction response message stream.

If the message is a message other than a control message, operation proceeds from step 650 to step 652 in which the gateway processed the received message in accordance with the type of message that was received and/or which device was the source of the message. For example, some messages may be ignored if they are from a source which the gateway does not trust.

With the received message being handled in one of steps 652 or 654 operation proceeds from these steps to step 656. While the processing of an individual message may stop in step 656, the receipt and processing of other messages at the gateway may continue as long as the gateway is powered on and remains operational.

Figure 7:
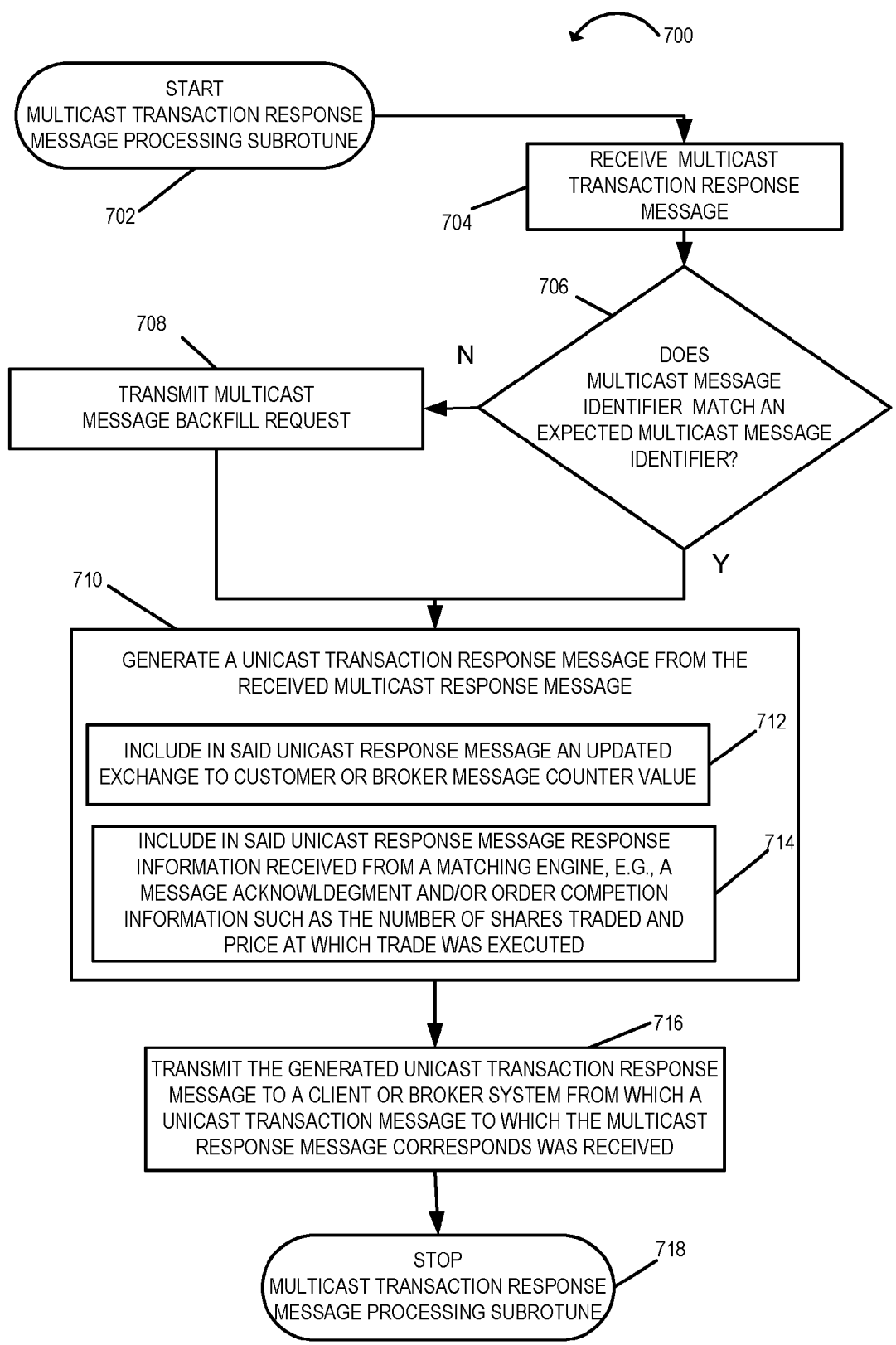
FIG. 7 is a flowchart illustrating the steps of an exemplary multicast transaction response message processing method in accordance with various embodiments.

Referring once again to FIG. 6A, if in step 608 it is determined that the received message is a multicast transaction response message, operation proceeds to step 610 wherein processing of the received multicast transaction response message is passed to a processing subroutine 700 such as the one shown in FIG. 7 for further handling.

The exemplary multicast transaction response message processing routine 700 will be discussed in detail.

From start step 702 operation proceeds to receive step 704 in which a multicast transaction response message received the gateway is received from the main gateway message handling routine 600 for processing. In step 706, a multicast message identifier included in the received multicast transaction response message is checked to see if it matches an expected multicast message identifier. Expected multicast message identifiers may be stored and/or generated by a gateway on a per message stream basis. Generation of an expected multicast message identifier by the gateway can be based on information included in one or more received messages and information about how the message identifier is to be updated from one message to the next. For example, the gateway can generate an expected message identifier from the message identifier included in the last message corresponding to the same message stream as the received transaction response message being processed.

If the received multicast message identifier does not match the expected message identifier a multicast message backfill request is transmitted in step 708. The multicast message backfill request may specify a range of multicast message identifiers which are used to identify messages which the gateway believes may not have been received based on the received message identifier differing than the expected message identifier, e.g., the received message identifier including a message counter value higher than an expected message counter value of the expected message identifier. In response to step 708 the gateway normally receives the requested missing multicast messages from one or more message logging devices which communicate some or all of the requested messages to the gateway. Operation proceeds from step 708 to step 710.

Operation proceeds directly from step 706 to step 710 if in step 706 it is determined that the multicast message identifier included in the received multicast message matches the expected multicast message identifier.

In step 710 a transaction response message to be sent by the gateway to a trader system which sent the transaction message to which the received multicast transaction response message is generated. The transaction response message generated by the gateway to be sent to a trader system is normally a unicast transaction response message. Thus, in many embodiments, step 710 involves generating a unicast transaction response message from the received multicast response message.

Figure 11:
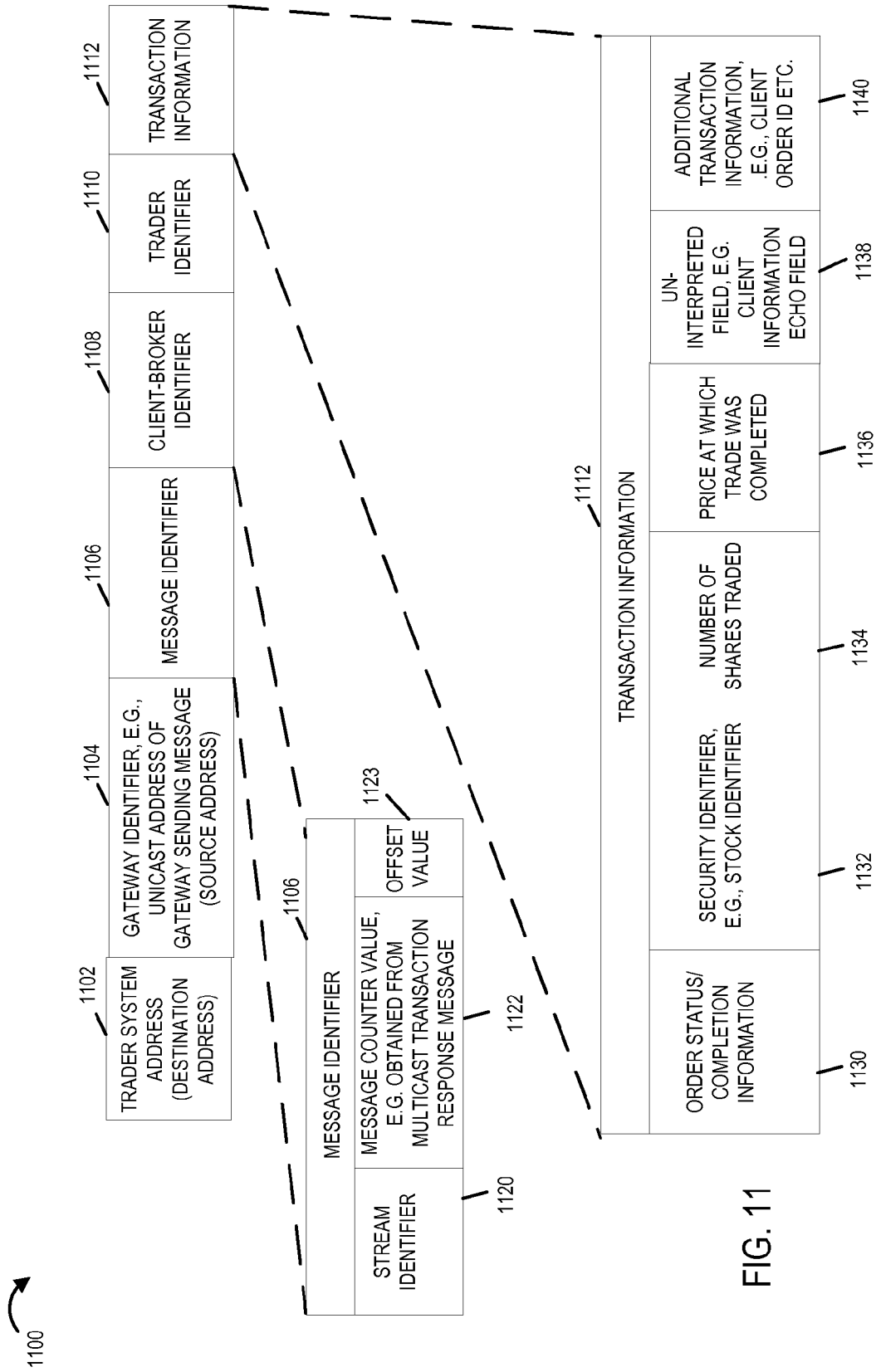
FIG. 11 illustrates an exemplary unicast transaction response message, e.g., communicated from a gateway device to trader system, in accordance with an exemplary embodiment.

FIG. 11 illustrates an exemplary unicast transaction response message 1100. The exemplary unicast transaction response message 1100 is similar in content and format to the unicast transaction message 800 which is already been described. The unicast transaction response message 1100 may, and in some embodiments is, generated and transmitted by a gateway in response to a received multicast transaction response message 1000.

The unicast transaction response message 1100 includes a trader system, address 1102 as a message destination address. The destination address 1102 will normally be the address of the trader system, e.g., trader system 112, to which the transaction message, e.g., unicast transaction message 800, being responded to corresponds. The message 1100 also includes gateway identifier 1104, e.g., a unicast address of the specific gateway, e.g., gateway 138, sending the transaction response message 1100.

The message 1100 also includes a message identifier 1106. In some embodiments the message identifier 1106 includes a stream identifier 1120 and a message counter value 1122. The message identifier 1110 may, and in some embodiments does, also include an offset value 1123 indicating the increment added to the message counter value of the last response message corresponding to the identified stream to generate the current message counter value 1122 included in the message 1100. The message counter value 1122 will normally be the same as the message counter value 1022 of the multicast transaction response message from which the unicast transaction response message is generated.

The stream identifier 1120 identifies a specific stream, e.g., a matching engine to trader stream. The message counter value 1122, e.g., obtained from the multicast transaction response message, is normally updated, e.g., changed, each time a message corresponding to the identified stream is sent by the matching engine.

In addition to the message identifier 1106, the unicast transaction response message 1100 includes a client-broker identifier 1108, trader identifier 1110 and/or transaction information 1112. Transaction information 1112, includes in some embodiments, order status and/or completion information 1130, a security identifier 1132, e.g., stock identifier, information on the number of shares traded 1134, information 1136 on the price at which the trades were completed, uninterpreted field information 1138, e.g., client information echo field information, and/or additional transaction information 1140 such as a client order ID which may be the same as the client order ID of the original trader transaction message 800 to which the unicast transaction reply message 1100 corresponds.

In various embodiments the information supplied by the client device, e.g., trader system 112, in uninterpreted field 838 of unicast transaction message 800 is returned, e.g., echoed back without alteration, in a unicast transaction response message 1100, which is in response to unicast transaction message 800. In some such embodiments, the information in uninterpreted fields (838, 938, 1038, 1138) of messages (800, 900, 1000, 1100) is identical corresponding to the same transaction.

Step 710 may, and in some embodiments does include steps 712 and/or step 714. Step 712 includes including in said uncast response message an updated exchange to trader message identifier, e.g., counter value, which is different from the message identifier value sent to the particular trader device in the last exchange to trader message which was sent to the trader to whom the generated transaction response message is being sent. The counter value included as all or a portion of the generated unicast transaction message may be the same or different from the message identifier included in the multicast transaction response message from which the unicast transaction message is generated.

In step 714, information received from the matching engine regarding the transaction to which the reply message corresponds is included in the generated unicast transaction response message. Such information may include the transaction information 916 as well as the identifiers 910, 912 and or 914. The client order ID to which the unicast transaction message corresponds may be included in the generated unicast transaction response message to allow the trader system to which the message is communicated to match it to an order which was sent to the exchange in a transaction message.

In step 716, the generated unicast transaction response message which was produced by the gateway in step 710 is transmitted to the client or broker system, e.g., trader system, from which the transaction message to which the transaction response message corresponds, was received. The transmission of the generated unicast transaction response message may be via security switch 120 which is responsible for sending the message to the trader via the correct communications link to the trader system to which the generated transaction reply message is directed.

Various features relating to the message logging system 134 and the generation and processing of message gap fill request messages will now be discussed with reference to FIG. 12-15.

Figure 12:
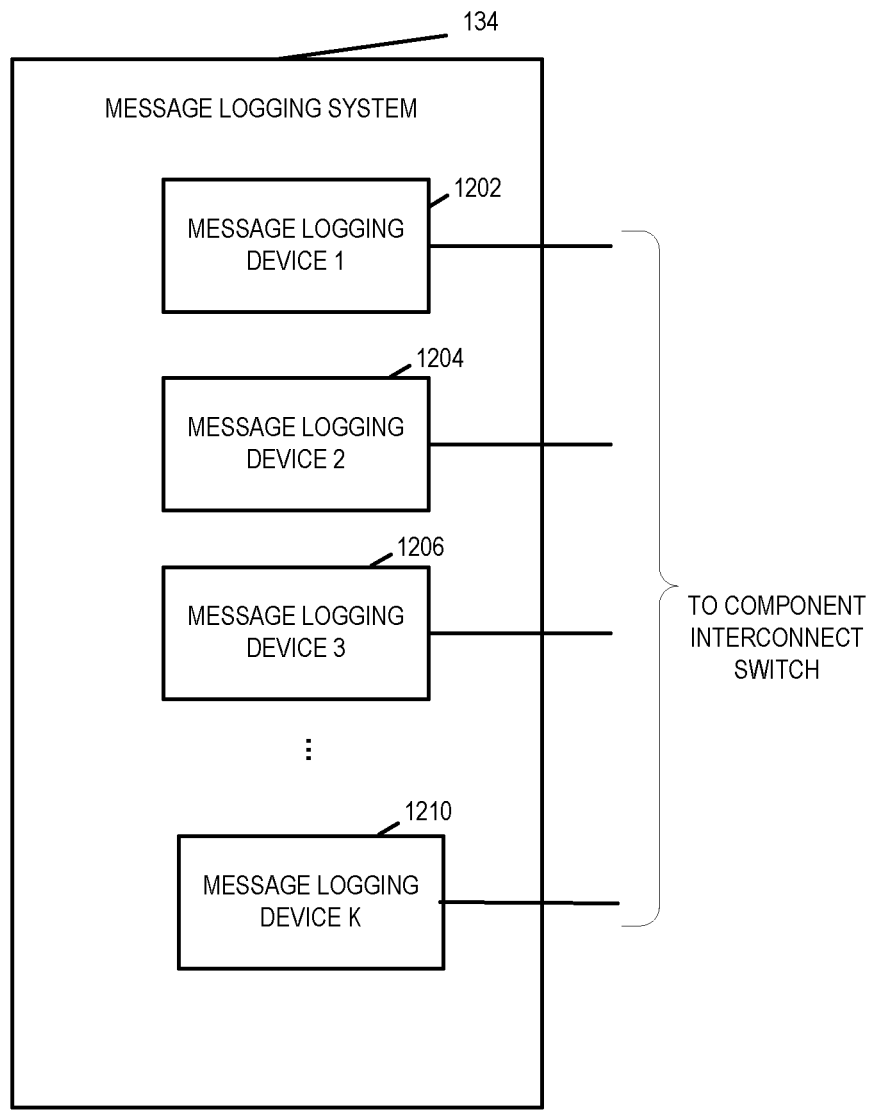
FIG. 12 illustrates an exemplary message logging system in the exemplary system shown in FIG. 1.

FIG. 12 illustrates an exemplary message logging system 134 which can be used in the system 100 shown in FIG. 1. As illustrated the message logging system includes a plurality of message logging devices, e.g., a first message logging device 1, 1202, a second message logging device 1204, a third message logging device 1206 and a Kth message logging device 1210. One or more of the message logging device 1202, 1204, 1206 and 1210 may differ in capabilities such as response times and amount of storage. For example, the first message logging device 1202 may be a high speed memory logging device used for caching recently communicated messages, e.g, one or a few minutes of messages. The second logging device may be a memory based device with slower memory chips than the first message logging device 1202 but with more storage capacity, e.g., several hours of message storage capacity. The third message logging device 3 may be a hard disc based message logging device 1206 with a large amount of storage capacity, e.g., capable of storing weeks or even months of system messages. For an individual message stream, e.g., identified by a particular stream identifier, multiple message logging devices may store messages corresponding to the identified stream. While messages stored in the high speed cache message logging device 1202 may be stored and transferred to logging devices 2 and/or 3 for longer term storage, in some embodiments all three message logging devices 1202, 1204 and 1206 are members of the same multicast group and receive multicast messages corresponding to the stream or streams they are responsible for maintaining a message. The message logging device 1202, 1204 and 1206 will store the messages corresponding to the streams they are responsible for logging. Backup message logging devices may also receive and store messages corresponding to the same stream(s) as message logging devices 1202, 1204, 1206. Thus, as should be appreciated, multiple message logging devices may receive and store the same messages. The devices 1202, 1204 and 1206 may differ in the number of messages they store for a particular stream and, given the different types of storage they may use, may have different response times and/or differ in the number of messages they can output in a given period of time in response to a request.

Message logging devices 1202, 1204, 1206 store information indicating the messages, e.g., number ranges, of messages for the streams they store, capability information with regard to how quickly they can respond to a message request and the same or similar information for the other message logging devices in the system 100. Device response rate capability information may be, and in some embodiments is, expressed and stored in a simple numerical form, e.g., with high speed cache devices being assigned a 1 for speed, short term memory based storage devices such as message logging device 2 being assigned a 2 for speed and message logging device 3 with relatively slow hard discs being assigned a 3 for speed. Message logging devices 1202, 1204, 1206 and 1210, can and in some embodiments do, also store information on the status of the other devices in the system. For example, message logging device 1 1202 may store information about when message logging devices 2 and 3 are available and functioning and/or information about when they are off-line due to a system fault or some other condition. Message logging device status information may be supplied by control device 132 or inferred by a failure of a message logging device to respond in a timely manner to a message which it should have received.

Figure 13:
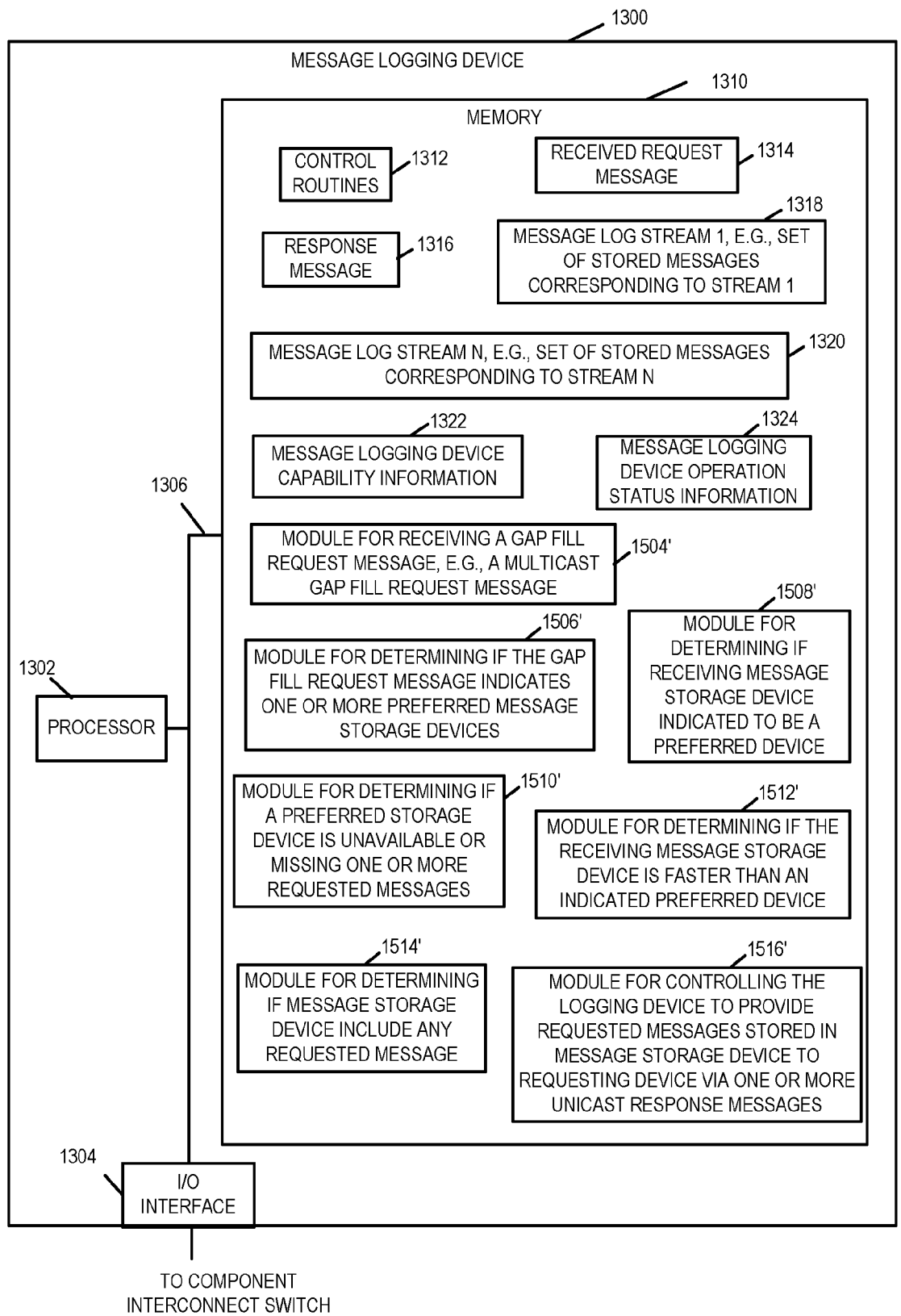
FIG. 13 illustrates an exemplary message logging device which can be used as one of the message logging devices of the message logging system shown in FIG. 12.

FIG. 13 illustrates an exemplary message logging device 1300 which may be used as anyone of the exemplary message logging devices of the message logging system 134 shown in FIG. 12. The exemplary message logging device 1300 includes a processor 1302, an I/O interface 1304, and a memory 1310 coupled together by bus 1306. While not shown, the message logging system 1300 may, and sometimes does, also include a user input device such as a keyboard and/or a user output device such as a display to allow a system administrator to interact directly with the message logging device rather than through the component interconnect switch which is also a viable way of interfacing with the message logging device 1300.

Figure 15:
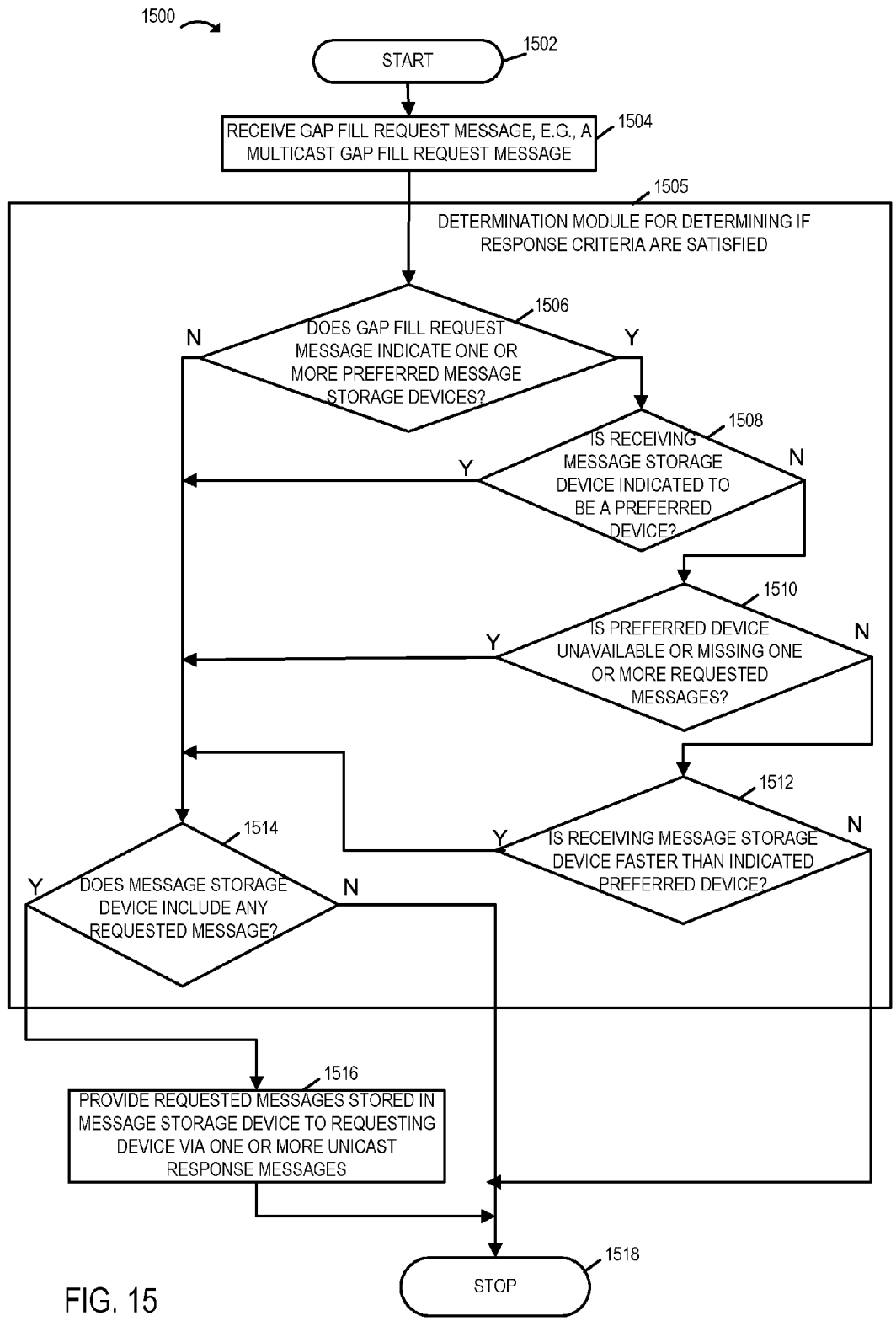
FIG. 15 shows an exemplary gap fill request message processing method implemented by one or more message logging devices, e.g., of the exemplary message logging system shown in FIG. 12.

The processor 1302 under control of one or more routines stored in the memory 1310 controls the message logging device 1300 to operate in accordance with the methods of the present invention, e.g., in accordance with the method shown in FIG. 15.

The I/O interface 1304 couples the message logging device 1300 and the components included therein to the component interconnect switch 126 thereby allowing the message logging device 1300 to receive and send, e.g., exchange, a variety of messages and other signals with other components of the system 110. Memory 1310 includes one or more control routines 1312 which when executed by the processor 1302 cause the message logging device to receive, store, process and respond to messages in accordance with the present invention. For example, the control routine 1312 may cause the message logging device to store unicast and multicast transaction messages corresponding to streams to which the message logging device receives and logs. While the message loggin device may receive multicast messages as part of being a member of a multicast group, it can receive unicast messages by having them forwarded by a device, e.g., a gateway device, sending or receiving a unicast message. Thus, a gateway device may, and in some embodiments does, send copies of multicast messages to one or more message logging devices for logging. In some embodiments, messages are logged on a per stream basis. Multicast messages used within the exchange system 100 and/or unicast messages received by or transmitted by the exchange system 100 may also be logged, e.g., stored in association with a corresponding stream identifier.

Message logs corresponding to different message streams, e.g., message log 1318 corresponding to stream 1' and message log 1320 corresponding to stream N are stored in memory 1310. Also stored in memory 1310 is message logging device capability information 1322 which includes device capability information such as that described above for the message logging device 1300 and for one or more message logging device in the system 100. The device capability information may be expressed in terms of a code or number associated with an identifier corresponding to the device to which the particular stored capability information corresponds. The capability information may indicate the speed of the device and/or the range of messages it can and/or does store. The memory 1310 also includes message logging device status information 1324 which indicates, on an individual message logging device basis, whether the message logging device is functional or not. It may also indicate ranges of message which were not stored in a message logging device, e.g., due to a system failure or the particular message logging device being off line, e.g., in the recent past when one or more messages were originally sent.

The message logging device status information 1324 also includes information indicating the status of the other message logging devices in the system. For example, information 1324 may indicate that message logging devices 1202, 1204, 1206 are operational and that message logging device 1210 is non-operational, e.g., off-line. The status of the message logging devices which is stored in the information 1324 is obtained passively in some embodiments by monitoring messages sent by the devices and/or a control device in the system. However, in other embodiments the message logging device 1300 periodically polls the other message logging devices to check their status. In some embodiments a combination of monitoring and polling to determine device status is used. The device status information 1324 may include information indicating the period of time one or more of the logging devices for which information is stored is or has been off-line and information on the messages, e.g., the number range of messages corresponding to one or more streams, stored in particular message logging devices.

Message logging devices 1300 can be added to or removed from the system as part of general maintenance, system upgrades or due to faults. A message logging device can update its internal log of messages by sending a message gap fill request to a multicast address and by then having one or more other devices supply the requested messages, e.g., by using unicast messages, just as they would respond to another device in the system requesting a message gap fill. Thus, message logging devices can be added to the system and automatically provisioned through the use of simple gap fill request messages so they can have a proper log of the messages they are assigned to maintain a log for.

As will be discussed below, devices in the system 110 may discover new message logging devices via the message logging device responding to a multicast gap fill request message which they hear as a result of being a member of one or more multicast groups. Devices can use the responses to gap fill request messages to identify one or more message providers and to update the preferred message provider information as faster devices or newly added devices respond to gap fill request messages.

Figure 14A:
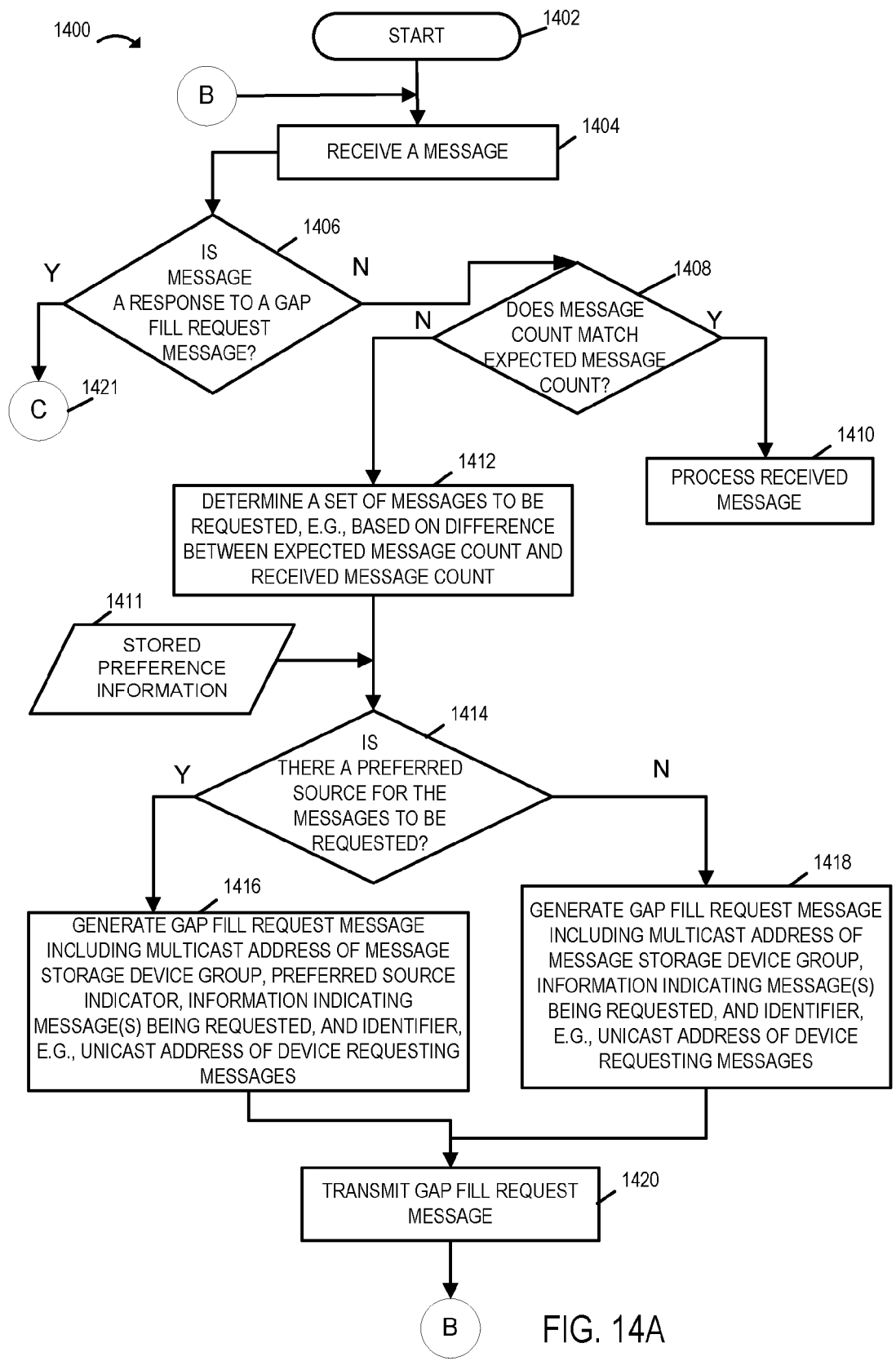
FIG. 14, which comprises the combination of FIGS. 14A and 14B, illustrates a message processing routine which may be implemented in a gateway, matching engine, market data, communications system, monitoring system or any one of a plurality o devices included in the system exemplary system shown in FIG. 1.
Figures 14, 14A, 14B:
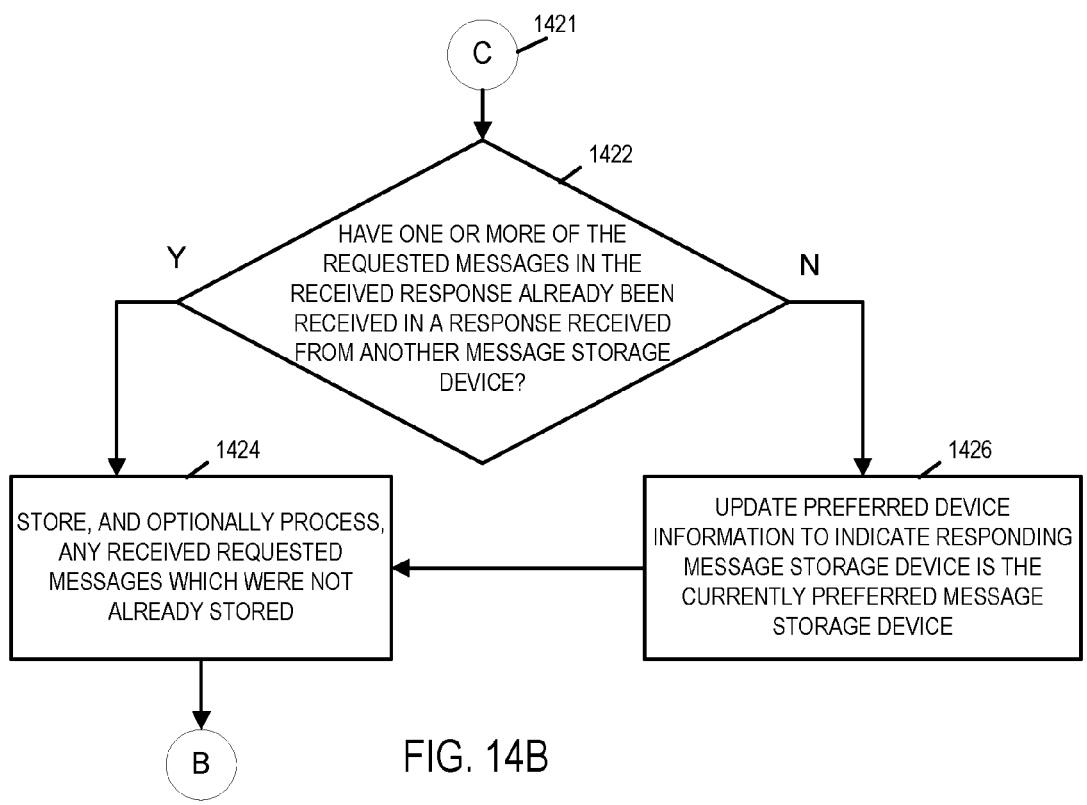

A message handling process shown in FIG. 14, which comprises the combination of FIGS. 14A and 14B, will now be described. The method shown in FIG. 14 may be implemented by any one of a plurality of devices within the exchange system 110 included, e.g., the monitoring system 131, gateways 138, 140, 142, 144, message logging devices of the message logging system 134, market communications system 136 and/or any one of the matching engines 146, 148, 150, 152.

The message processing method 1400 may result in the detection that a previously transmitted message was not received, generation and transmission of a message gap fill request message seeking one or more missing message to be supplied, and the processing of one or more received messages including messages supplied in response to a gap fill request message. While the device implementing the method 1400 may not initially have a preferred message logging device set as its preferred source for missing messages, based on one or more responses to gap fill request messages, the device may set and update a message logging device as a preferred source for missing messages. The preference may be based on the responsiveness, e.g., how quickly a particular message logging device responds to a gap fill request message by supplying one or more requested messages. The method 1400 allows for the discovery and selection of new logging devices as preferred message providers in an efficient manner which requires little or no control messaging overhead, e.g., the device implementing the method need not be provided with a separate message indicating the addition of a message logging device to the system to be able to detect and take advantage of the new message logging device's capabilities. This is achieved, in part, by message logging devices belonging to multicast groups to which gap fill request messages are sent and by having message logging devices respond to gap fill request messages as will be explained further with reference to FIG. 15.

The method 1400 starts in step 1402 with the device implementing the method being activated. With the device being active, it monitors for messages. In step 1404 a message is received, e.g., from another device in the system 110. For example, if the device implementing the method is a matching engine 146, the received message may be from a gateway 138.

Operation proceeds from step 1404 to step 1406. In step 1406 a determination is made as to whether the received message is a message received in response to a gap fill request message. If the received message is a response to a gap fill request message operation proceeds to step 1422 via connecting node C 1421.

If in step 1406 it is determined that the received message is not in response to a gap fill request, i.e., that it is a new message, operation proceeds to step 1408. In step 1408 a message count included in the received message is compared to an expected message count. The expected message count may be based on message offset information included in the received message and the message count value of the last message corresponding to the same message stream as the received message. For example, when a message such as the message 800 is being processed, the stream identifier 820 is used to identify the stream to which the message corresponds. The message counter value of the last message corresponding to the identified stream is then retrieved from memory and incremented. To generate the expected message counter value, the last message counter value is incremented by a predetermined number, e.g., 1, if an offset value, e.g., offset value 823, is not included in the received message or by the offset value if such a value is included in the received message.

If the message counter value included in the received message matches the expected message counter value, it indicates that there are no missing messages and that the device received the last message in the stream to which the received message corresponds. However, if the message counter value in the received message does not match the expected message counter value, the difference indicates that one or more messages corresponding to the stream to which the received message corresponds were not received.

If the message counter value in the received message matches the expected message counter value operation proceeds to step 1410 wherein the message is further processed. The processing implemented in step 1410 will depend on the device implementing the method and the type of message being received. Normally however, the processing will include updating the last message counter value stored in the device for the stream identified in the message to match the counter value of the received message. Thus, the last message counter value stored in the device will be current and reflect the value of the most recently received message. For example, if the message is an order message received by a matching engine, the matching engine will normally try to implement the requested order by, e.g., performing a matching operation if it is handling the order book for the security identified in the order message. If the device implementing the method is a gateway device it may generate and forward a message to another device in response to the received message. Other actions are possible depending on the particular device performing the method as well.

If in step 1408 it is determined that the message count value included in the received message does not match the expected message count value, operation proceeds to step 1412. In step 1412 a determination is made as to what messages are to be requested. Normally, this will involve using the counter value of the last received message and the counter value of the most recently received message with the difference between the two counter values indicating the range of missing messages to be requested. The range may be specified in a gap fill request, e.g., by providing the counter value of the last received message corresponding to the stream identified in the received message and a number indicating the difference between the last received message counter value and the most recently received counter value. Alternatively, the last received message counter value and the message counter value included in the received message can, and in some embodiments are, used to indicate the set of message to be requested, i.e., a logging device receiving the lower and higher message counter values corresponding to a stream in a gap fill request message knows that the messages corresponding to the identified stream with message counter values between the lower and higher values are to be supplied to the requesting device.

With the range of messages to be requested having been determined in step 1412, operation proceeds to step 1414. In step 1414 a check is made to determine if the device implementing the method 1400 has stored information 1411 identifying a preferred logging device to supply missing messages, e.g., in response to a gap fill request. In some embodiments different preferred logging devices are set for different streams in which case the check in step 1414 is with regard to the preferred message logging device corresponding to the stream for which the missing message are being sought.

If a preferred source for the missing message is not set, operation proceeds to step 1418 in which a gap fill request message is generated without the inclusion of information identifying a preferred source of the messages.

Figure 16:
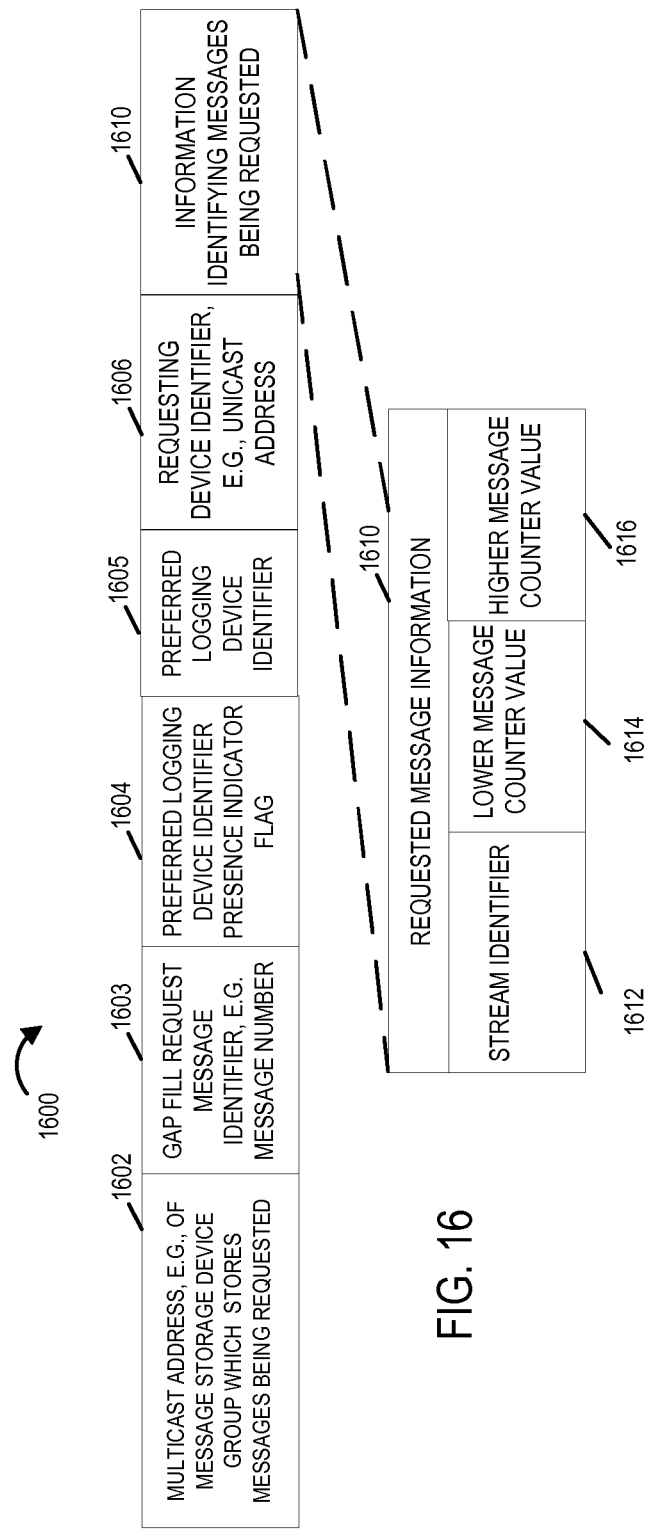
FIG. 16 illustrates an exemplary gap fill request message which may be used to request one or more messages from the message logging system of FIG. 1.

The gap fill request message generated in step 1418 may be of the type shown in FIG. 16. The gap fill request message 1600 shown in FIG. 16, may, and in various embodiments is, used to request messages from the message logging system. The message 1600 includes a multicast address 1602 indicating the destination of the message and an optional gap fill request message identifier, e.g., a message number, which can be returned in a response message to facilitate matching of a response to the request message to which it corresponds. The multicast address 1602 is, for example, an address of a message storage device group, e.g., a group of message logging devices, which stores the message or messages being requested. In some but not all embodiments, the message 1600 also includes an indicator 1604 used to indicate whether or not the message 1600 includes information identifying a preferred message logging device. In some embodiments the indicator is implemented as a one bit field which is set to one to indicate the presence in the message of a preferred logging device identifier 1005 and is set to zero when a preferred logging device identifier is not included in the message 1600. The flag 1604 can facilitate processing of the message by a device receiving the message since, rather than having to parse the message for a preferred logging device identifier its presence or absence can readily be determined by the value communicated by the flag 1604. The preferred logging device identifier 1605 identifies a preferred message logging device for supplying the requested message(s). This field is omitted from the message or left empty when no preferred logging device is specified. The preferred logging device identifier maybe, and in some embodiments is, a unicast address corresponding to the preferred device. Included as part of the preferred logging device identifier 1605 or in addition to the identifier 1605 may, and in some embodiments is, information indicating what type of logging device, e.g., hard disc, memory device, etc., the indicated preferred message logging device is. The device type may be indicated as a numerical value with the relative speed, e.g., how quickly the logging device can respond, being known from the device time information.

In addition to the preferred logging device identifier field 1605 the message 1600 includes a requesting device identifier 1606 which identifies the device requesting, e.g., sending, the gap fill request message. The requesting device identifier 1006 may be a unicast address corresponding to the requesting device which can be used as the destination address of one or more messages used to communicate the requested messages to the requesting device in response to the message 1600. In addition to the other fields, message 1600 includes information 1610 identifying the messages being requested. The identification information includes, in some embodiments, a stream identifier 1612, a lower message counter value 1614 and a higher message counter value 1616. The counter values 1614, 1616 are used to indicate a range of messages being sought corresponding to the stream identifier 1612, e.g., it may be interpreted as a request for all messages corresponding to the identified stream having message counter values falling between the lower and higher message counter values. Given that the message counter values may be incremented in some embodiments by non-regular amounts, the precise number of messages being requested or which were not received may not be known to the device generating and sending message 1600.

Referring once again to step 1418, it should be appreciated that generation of the gap fill request message may involve including information corresponding to each of the fields shown in the message 1600 with the exception of the preferred logging device identifier field given that there is no preferred logging device being indicated in the message generated in step 1418. With the generation of the gap fill request message having been completed in step 1418, operation proceeds to step 1420.

If in step 1414 it was determined that the device generating the gap fill request message had stored preference information indicating a preferred source of messages, operation would proceed from step 1414 to step 1420 via step 1416 instead of step 1418. In step 1416 a gap fill request message, e.g., a multicast gap fill request message 1600 is generated with information indicating a preferred message source, e.g., logging device, included in field 1005 and if present, the preferred logging device identifier presence indicator field 1604 would be set to indicate the presence of the preferred logging device indicator.

Once the gap fill request message is generated in step 1416 operation proceeds to step 1420. In step 1420 the generated gap fill request message is transmitted, e.g., to the multicast group address corresponding to the group of message logging devices which store messages corresponding to the stream identified in the transmitted message.

Operation is seen proceeding from step 1420 to step 1404 via connecting node B to represent that the device sending a gap fill request message will monitor for a response message from a message logging device communicating one or more of the messages requested in the transmitted gap fill request message. Such a response message may be received in step 1404.

If a message received in step 1404 is a response to a gap fill request message, message processing proceeds from step 1404 via step 1406 and connecting node 1421 to step 1422. In step 1422 a check is made to determine if one or more requested messages in the received response message were already received in a message received from another message logging device, e.g., a faster more responsive message logging device than the one which sent the received gap fill response message being processed. If it is determined that none of the requested messages included in the received gap fill response message have already been received from another message logging device, operation proceeds to step 1426 wherein the device performing the processing updates its preferred message logging device information to indicate that the responding device is the new preferred message logging device which should be indicated as the preferred message logging device in future gap fill request messages.

Thus, a device requesting a gap fill request will update its preferred logging device information based on which logging device is the quickest to respond to a gap fill request message. If a faster logging device is added and is a member of the multicast group to which a gap fill request is directed, the requesting device will learn of the new message logging device via its response and will update its stored preferred message logging device information accordingly based on the which device provides the fastest response at a particular point in time. Since the preferred message logging device information is updated based on responsiveness of the message logging devices, as a particular message logging device becomes heavily loaded and/or new devices are added to the system, the requesting device will update its preferred device information over time based on the response messages it receives. Operation proceeds from step 1426 to step 1424.

In step 1422 if it was determined that one or more messages were already received from another message logging device, operation would proceed to step 1424 without passing through step 1426 since there is no need to update the preferred message logging device information.

In step 1424 the requested messages included in the response to the gap fill request messages which have not already been stored and processed are stored and optionally processed. For example, a matching engine may temporally store a received message process the order communicated by the requested message if the order has not already been processed and responded to. On the other hand, if the device which requested the gap fill was a message logging device, the device may store the message in the message log corresponding to the stream to which the message corresponds, thereby filling any gaps that may exist in its copy of the message log it is maintaining.

Operation is seen proceeding from step 1424 to step 1404 via connecting node B to illustrate that message receipt and processing operations are performed on an ongoing basis and that message receipt and processing does not end with the completion of step 1424.

FIG. 15 illustrates a method 1500 implemented by an exemplary message logging device, e.g., device 1300, which is used to control the message logging device to receive, process and respond to gap fill request messages, e.g., messages of the type shown in FIG. 16. Generally, the method 1500 is designed so that a message logging device receiving a multicast gap fill request message will respond if the message logging device has requested messages and i) there is no preferred message logging device indicated in the request message; ii) the message logging device is a message logging device indicated to be a preferred message logging device; ii) the message logging device is faster than an indicated preferred message logging device or ii) the message logging device knows message logging device indicated in the message as the preferred message logging device is unavailable or does not include some or all of the requested messages. Thus, even though multiple message logging devices may have the requested stored messages and they may hear the same gap fill request message, depending on the content of the gap fill request message, all message logging devices which could respond may not do so.

In at least some embodiments when the multicast gap fill request message does not indicate a preferred message logging device identifying a preferred responder, all the message logging devices which hear the message and are capable of responding will do so. However, in some embodiments if a slower message logging device determines that a faster message logging device has already responded, e.g., by being copied on a response message through the use of multicast signaling, the slower message logging device may stop its process of responding without sending a response message which the slower message logging device would send absent knowledge that the faster device has already responded.

The method 1500 begins in start step 1502. In step 1504 a gap fill request message is received by the message logging device implementing the method 1500. The message may be, e.g., a multicast gap fill request message of the type shown in FIG. 16 which is addressed to a multicast group to which the logging device implementing the method belongs. Operation proceeds from step 1504 to a set of steps 1506, 1508, 1510, 1512, 1514 which in combination operate as a determination module 1505 used to determine if response criteria are satisfied. The individual steps may be implemented as individual modules. Depending on the embodiment, one or any combination of steps 1506, 1508, 1510, 1512, 1514 may be used to determine if response criteria are satisfied and a unicast reply message should be generated and transmitted, e.g., in step 1516.

In step 1506 a check is made to determine if the gap fill request message indicates one or more preferred storage devices, e.g., the devices the sender prefers for responding to the message. Step 1506 may be implemented by checking the value of the preferred logging device identifier presence indicator field 1604 when such a field is present in the message or by parsing the message to determine if an identifier of preferred logging device is included in the received message.

If in step 1506, it is determined that the received gap fill request message does not indicate one or more preferred message storage devices, operation proceeds to step 1514, otherwise operation proceeds to step 1508. In step 1508 a further check is made on the received gap fill request message to determine if the message logging device implementing the method 1500 which received the gap fill request message, e.g., because it is part of the multicast group to which the received message was addressed, is indicated in the message to be a preferred message storage device, e.g., the requesting device has indicated that the message logging device is the preferred device for responding. If the message logging device processing the received message is indicated to be the preferred device operation proceeds to step 1514 otherwise operation proceeds to step 1510.

In step 1510 a check is made to determine whether the preferred message logging device indicated in the received gap fill request message is unavailable or missing one or more of the requested messages. This may be done by checking device status information and/or information indicating the range of messages stored by various message logging devices in the system. Such information may be supplied by a control device and/or determined by monitoring various signals and/or messages in the exchange system. Operation proceeds from step 1510 to step 1514, if in step 1510 it is determined that the preferred device message logging device indicated in the received message is unavailable or missing one or more requested messages otherwise operation proceeds to step 1512.

In step 1512, a check is made to determine if the message storage device which received the gap fill request message and is implementing the method 1500 is faster than the message logging device indicated in the received gap fill request message to be the preferred message logging device. This determination may be made by checking stored information indicating the type and/or speed of the preferred message logging device and/or checking speed or type information included in the preferred message logging device identifier and comparing it to known information about the speed of the message logging device implementing the method. For example, if the preferred message logging device has a speed rating of 3 and the receiving message logging device processing the gap fill request message has a speed rating of 1, with a higher rating number indicating a slower device, step 1512 would determine that the message logging device implementing method 1500 is faster than the preferred message logging device indicated in the gap fill message being processed. If in step 1512 it is determined that the message logging device processing the gap fill request message is faster than the preferred message logging device, operation proceeds from step 1512 to step 1514 otherwise operation proceeds to stop step 1518 without transmission by the logging device processing the gap fill request message of a response to the received gap fill request message.

In step 1514, the logging device determines if it includes any of the requested messages. If the answer is yes, the message logging device responds in step 1516, e.g., with a unicast gap fill message request response message. Step 1516 may include two separate steps, a unicast message generation step and a transmission step. In the unicast message generation step a unicast response message directed to the requester which sent the gap fill request message is generated. In the transmission step the unicast message is transmitted, e.g., to the requester. The message may be of the type illustrated in FIG. 17 and will normally be addressed to the unicast address of the device which sent the gap fill request message requesting one or more messages.

If, however, in step 1514 it is determined that the message logging device processing the received message does not have any of the requested message, operation proceeds to stop step 1518 without a response to the received gap fill request message being sent from the particular message logging device implementing method 1500.

It should be appreciated that the method 1500 when implemented by a particular individual message logging device may result in the message logging device stopping processing of the received gap fill request message without transmitting a response, the system includes multiple message logging devices and another message logging device in the same multicast group and performing the same method 1500 is likely to respond to the message, e.g., because it is indicated to be the preferred message logging device.

As described with regard to FIG. 15, some embodiments are directed to methods and apparatus for responding to gap fill request message, e.g., a multicast gap fill request message, by responding to the sender of the multicast gap fill request message with a unicast message communicating at least one of the requested messages. At least one such embodiment is directed to a method of operating a message logging device, the method comprising: receiving a multicast gap fill request message sent by a requesting device requesting one or more messages; determining if response criteria are satisfied; and if it is determined that response criteria are satisfied, generating a unicast response message communicating at least one requested message; and transmitting the unicast response message to the requesting device. In the particular exemplary embodiment, determining if response criteria are satisfied sometimes includes determining if the multicast gap fill request message indicates a preferred message storage device for supplying the requested one or more messages; and wherein said response criteria are satisfied if is determined that said gap fill request message does not indicate a preferred message storage device and said message logging device includes a requested message.

In some embodiments said response criteria are satisfied if is determined that said gap fill request message indicates a preferred message storage device and said message logging device is the indicated preferred message storage device. Determining if response criteria are satisfied also includes, in some embodiments, checking to determine if said message logging device is faster than a preferred message storage device, and wherein said response criteria are satisfied if is determined that said message logging device is faster than a preferred message storage device. Determining if response criteria are satisfied also includes, in some embodiments, checking to determine if a preferred message storage device is unavailable, with the response criteria being satisfied if is determined that said preferred message storage device is unavailable. A message logging device may, and in some embodiments does, include a module for performing each of the above discussed steps, e.g., checking, determining, message generation, message transmission, etc. The module may be implemented in hardware, software or a combination. In some embodiments the modules are implemented as circuits. In such embodiments the modules may not involve the use of software.

Figure 17:
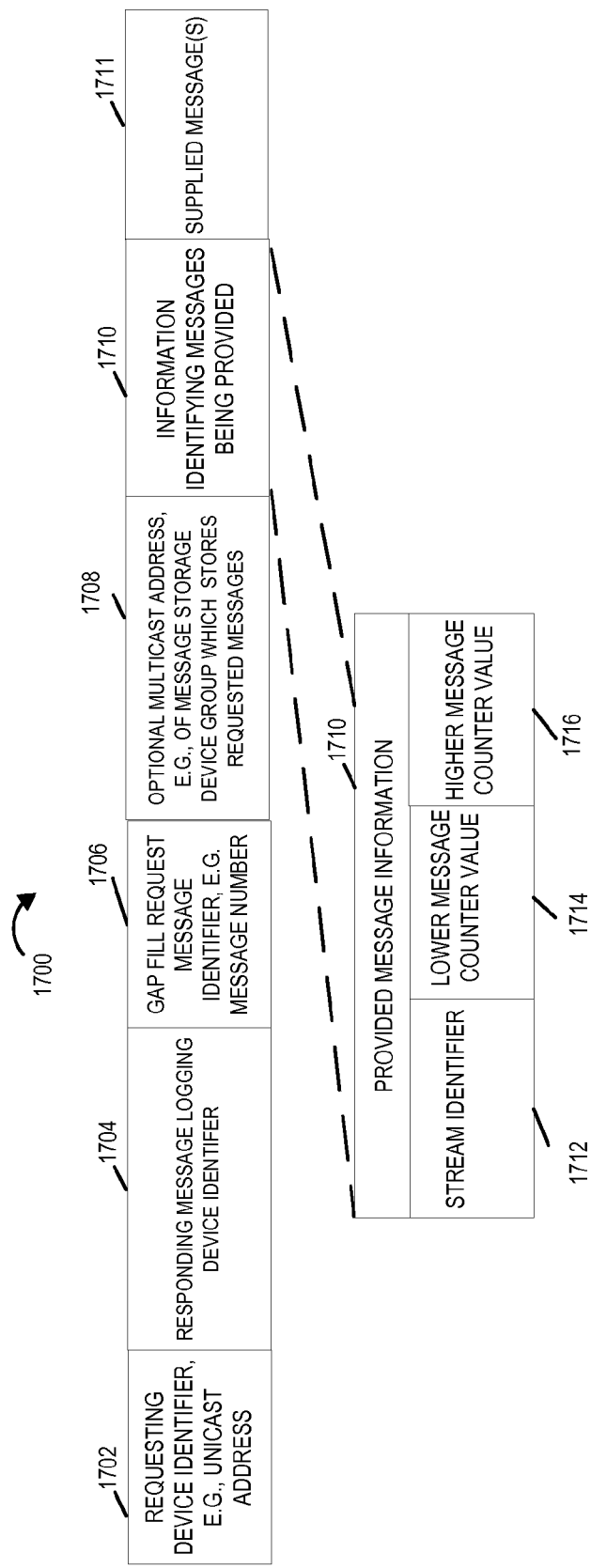
FIG. 17 illustrates an exemplary gap fill request response message which is sent in response to a gap fill request message in some embodiments.

An exemplary gap fill request response message 1700 which may be sent in step 1516 is shown in FIG. 17. The gap fill response message 1700 includes, e.g., as a destination address, a requesting device identifier 1702 such as a unicast address corresponding to the device which sent a gap fill request message to which the response message 1700 corresponds. In some embodiments, the unicast address 1702 is obtained from field 1606 of a gap fill request message which communicates an identifier, e.g., unicast address, of the requesting device. The message 1700 also includes a responding message logging device identifier 1704 which identifies the particular message logging device which generated message 1700. The information in field 1704 is used by the device receiving the response message 1700 to update its preferred message logging device information, e.g., when the message 1700 if the first message providing one or more messages which were requested in a multicast gap fill request message. A gap fill request message identifier 1706 is also included in the response message 1700. The content of this message field may be obtained from the gap fill request message identifier field 1603 which communicates a number identifying the message to which the response corresponds. The content of the gap fill request message identifier field 1706 allows a device receiving the response 1700 to match the response message to the gap fill request message that it transmitted.

The response message 1700 also includes, in some embodiments, an optional multicast address. The optional multicast address, in some embodiments, corresponds to the multicast address of the message storage device group which stores messages to which the response message relates. The multicast address in field 1708 may include the multicast address obtained from gap fill request message field 1602 or be a separate multicast address used to keep message logging devices informed of response which have been sent but to which the message logging devices do not respond. When message logging devices are copied on response messages via the sending of a copy to a multicast address of a group to which the message logging devices belong, the message logging device can be made aware of the responses which have already been transmitted and, in some embodiments, will not respond to a gap fill request message being processed after becoming aware that another message logging device has already responded with the requested message(s).

The gap fill response message 1700 also includes information 1710 identifying messages being provided and, as payload 1711, one or more requested messages. The information 1710 identifying the messages being provided may include, e.g., a stream identifier 1712, identifying the stream to which the messages being supplied correspond and one or more message counter values 1714, 1716 indicating the range of messages being supplied. In some embodiments the counter values corresponding to one or more of the messages being supplied are indicated in one or more counter value fields of message 1710. For example, lower message counter value may indicate the lowest message counter value number of a message being supplied while the higher message counter value number 1716 may indicate the highest counter value number of the message being supplied. Thus, in combination the stream identifier and one or more values 1714, 1716 indicate the messages being supplied as the payload of the response message 1700.

Numerous additional variations on the format of the message 1700 are possible.

Figure 18:
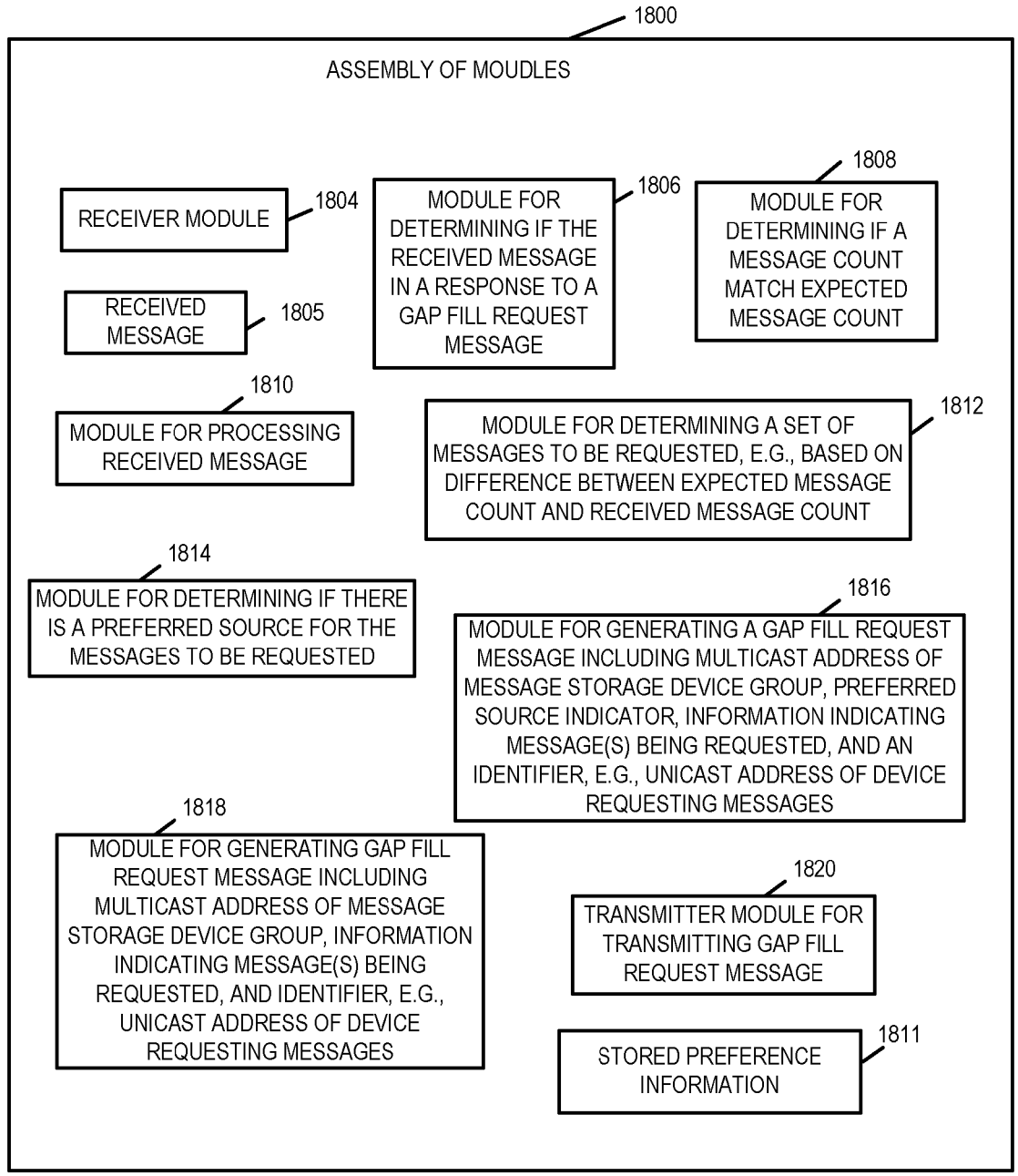
FIG. 18 illustrates an exemplary assembly of modules including various modules that may be used in one of a plurality of devices within the exchange system, in accordance with some embodiments of the invention.

FIG. 18 illustrates an assembly of modules including various modules what may be included in the control routines and/or implemented in hardware of one of the plurality of devices within the exchange system 110 including, e.g., the monitoring system 131, gateways 138, 140, 142, 144, message logging devices of the message logging system 134, market communications system 136 and/or any one of the matching engines 146, 148, 150, 152. For discussion purposes, consider that the assembly of modules 1800 is included in the control routines and/or implemented in hardware of gateway device 200 which implements the method of flowchart 1400.

The modules in the assembly 1800 can be implemented in hardware within a processor, e.g., as individual circuits. Alternatively, the modules may be implemented in software and included in the control routines, e.g., of the gateway device 200.

When implemented in software the modules include code, which when executed by the processor, configure the processor 208, e.g., a computer, to implement the function corresponding to the module. In some embodiments, processor 208 is configured to implement each of the modules of the assembly of modules 1800. In embodiments where the assembly of modules 1800 is stored in the memory 212, the memory 212 is a computer program product comprising a computer readable medium comprising code, e.g., individual code for each module, for causing at least one computer, e.g., processor 208, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 18 control and/or configure the gateway device 200 or elements therein such as the processor 208, to perform the functions of the corresponding steps illustrated and/or described in the method of flowchart 1400 of FIG. 14. For example, module 1802 performs the functions described with regard to step 1402.

The assembly of modules 1800 includes a receiver module 1804 for receiving a message, e.g., from another device in the system 110. For example, if the device implementing the method is a matching engine 146, the received message may be from a gateway 138. The receiver message is stored as message 1805. The assembly of modules 1800 further includes a module 1806 for determining whether the received message is a message received in response to a gap fill request message, a module 1808 for determining if a message count included in the received message 1805 match an expected message count, by comparing to the expected message count, an a module 1810 for processing the received message 1805. In some embodiments the processing is performed in various embodiments based on the type of message being received, e.g., a request message, a response message etc. If the message counter value included in the received message matches the expected message counter value, it indicates that there are no missing messages and that the device received the last message in the stream to which the received message corresponds. However, if the message counter value in the received message does not match the expected message counter value, the difference indicates that one or more messages corresponding to the stream to which the received message corresponds were not received.

In some embodiments the assembly of modules 1800 further includes a module 1812 for determining what one or more messages are to be requested, e.g., based on the difference between expected message count and received message count. The assembly of modules 1800, in some embodiments, further includes a module 1814 for determining if there is a preferred source for the messages to be requested. In some embodiments the module 1814 checks the stored information 1811 identifying a preferred logging device to supply missing messages, to make such determination.

The assembly of modules 1800 further includes a module 1816 for generating a gap fill request message, e.g., a multicast gap fill request message 1600, including information indicating a preferred message source, e.g., logging device, a preferred logging device presence indicator, information indicating message(s) being requested, and an identifier, e.g., a unicast address of device requesting the messages. The assembly of modules further includes a module 1818 for generating a gap fill request message that does not include information identifying a preferred source of the messages. Thus module 1818 is responsible for generating a gap fill request message including multicast address of message storage device group, information indicating message(s) being requested, and an identifier, e.g., a unicast address of device requesting the messages. Assembly of modules 1800 further includes a transmitter module 1820 for transmitting the generated gap fill request message, e.g., to the multicast group address corresponding to the group of message logging devices which store messages corresponding to the stream identified in the transmitted message.

From the above discussion it should be appreciated that numerous variations and embodiments are possible.

The techniques of various embodiments may be implemented using software, hardware and/or a combination of software and hardware. Various embodiments are directed to apparatus, e.g., gateways, severs, nodes, terminals, etc. Various embodiments are also directed to methods, e.g., methods of performing risk checking. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, generation and/or transmission steps. Thus, in some embodiments various features are implemented using modules. Such modules may be implemented using software, hardware or a combination of software and hardware. Thus, in at least some embodiments the modules are hardware modules. Many of the above described methods or method steps can be implemented using machine, e.g., computer, executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., gateway or other node, are configured to perform one or more of the steps of the methods described herein. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., node, with a processor which includes a module corresponding to each of the steps of the various described methods performed by the device in which the processor is included. In some but not all embodiments a device, e.g., node, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node. The code may be in the form of machine, e.g., computer, executable instructions stored on a non-transitory computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, control device or other device described in the present application.

While described in the context of an trading system, at least some of the methods and apparatus of various embodiments are applicable to a wide range of systems.

What is claimed is:

1. A method for use in an exchange system, the method comprising:
   receiving a first multicast message including a first multicast address as a destination address, said first multicast message further including a message identifier;
   determining if the message identifier matches an expected message identifier;
   when it is determined that the received message identifier does not match the expected message identifier transmitting a multicast gap fill request message requesting a message gap fill, said multicast gap fill request message including, as a destination address, a second multicast address corresponding to a first multicast group including a plurality of message logging devices;
   updating preferred lamina device information based on which lamina device is the quickest to respond to the clap fill request message; and
   using a response to a clap fill request message to identify a message logging device that was added to the exchange system.

2. The method of claim 1,
   wherein said multicast gap fill request message is addressed to said second multicast address corresponding to the first multicast group including the plurality of message logging devices; and
   wherein said plurality of message logging devices are members of a second multicast group which receives transmitted multicast messages which include said first multicast address as a destination address and which log the received messages by storing them.

3. The method of claim 1, further comprising:
   receiving at least one unicast response message in response to said multicast gap fill request message.

4. The method of claim 2, wherein said multicast gap fill request message includes preference information identifying one or no preferred responders.

5. The method of claim 4, wherein a message logging device which receives the multicast gap fill message responds with a unicast message if the message logging device is indicated in the received message to be a preferred responder.

6. The method of claim 5, where, if there is no preference indicated and the message logging device receives the multicast gap fill request message, the logging device which receives the multicast gap fill request message responds to it.

7. The method of claim 3, wherein if there is an indicated preference and a receiving logging device is not a preferred responder, operating the received logging device to respond if a predetermined constraint is satisfied, said predetermined constraint including the logging device determining that it has requested messages which the indicated preferred responder does not have.

8. The method of claim 3, wherein different message logging devices provide different ones of said requested messages in response to said multicast gap fill request message.

9. An apparatus for use in an exchange system, comprising:
a receiver configured to receive a first multicast message including a first multicast address as a destination address, said first multicast message further including a message identifier;
a matching module configured to determine if the message identifier matches an expected message identifier; and
a transmitter configured to transmit a multicast gap fill request message requesting a message gap fill, when it is determined that the received message identifier does not match the expected message identifier, said multicast gap fill request message including, as a destination address, a second multicast address corresponding to a first multicast group including a plurality of message logging devices; and
a processor configured to:
update preferred logging device information based on which logging device is the quickest to respond to the gap fill request message; and
use a response to a gap fill request message to identify a message logging device that was added to the exchange system.

10. The apparatus of claim 9, wherein said multicast gap fill request message is addressed to said second multicast address corresponding to the first multicast group including the plurality of message logging devices;
wherein said receiver is further configured to receive at least one unicast response message in response to said multicast gap fill request message;
wherein said multicast gap fill request message includes preference information identifying one or no preferred responders; and
wherein a message logging device which receives the multicast gap fill request message responds with a unicast message if the message logging device is indicated in the received message to be a preferred responder.

11. The apparatus of claim 9, wherein said plurality of message logging devices are members of a second multicast group which receive transmitted multicast messages which include said first multicast address as a destination address and which store the received messages including said first multicast address as a destination address.

12. An apparatus for use in an exchange system, comprising:
means for receiving a first multicast message including a first multicast address as a destination address, said first multicast message further including a message identifier;
means for determining if the message identifier matches an expected message identifier; and
means for transmitting a multicast gap fill request message requesting a message gap fill when it is determined that the received message identifier does not match the expected message identifier, said multicast gap fill request message including, as a destination address, a second multicast address corresponding to a first multicast group including a plurality of message logging devices;
means for updating preferred logging device information based on which logging device is the quickest to respond to the gap fill request message; and
means for using a response to a gap fill request message to identify a message logging device that was added to the exchange system.

13. The apparatus of claim 12,
wherein said apparatus is second message logging device; and
wherein said plurality of message logging devices are members of a second multicast group which receive transmitted multicast messages which include said first multicast address as a destination address and which store the received messages including said first multicast address as a destination address,
said plurality of message logging device including said second message logging device.

14. A method of operating a message logging device, the method comprising:
receiving a multicast gap fill request message sent by a requesting device requesting one or more messages, said multicast gap fill request message including, as a destination address, a first multicast address corresponding to a first multicast group including a plurality of message logging devices, said plurality of message logging devices including said message logging device;
determining if response criteria are satisfied, said determining if the response criteria are satisfied including determining if the multicast clap fill request message indicates a preferred message storage device for supplying the requested one or more messages, said response criteria being satisfied if is determined that said gap fill request message does not indicate a preferred message storage device and said message logging device includes a requested message; and
if it is determined that response criteria are satisfied,
generating a unicast response message communicating at least one requested message; and
transmitting the unicast response message to the requesting device.

15. The method of claim 14,
wherein said multicast gap fill request message requests one or more previously communicated multicast messages that were transmitted to the requesting device and said message logging device, each of the one or more previously communicated multicast messages included a multicast destination address corresponding to a second multicast group, said message logging device and said requesting device being members of said second multicast group.

16. The method of claim 14, wherein determining if response criteria are satisfied further includes:
determining that said gap fill request message indicates a preferred message storage device and said message logging device is the indicated preferred message storage device.

17. The method of claim 16, wherein determining if response criteria are satisfied further includes:
checking to determine if said message logging device is faster than the preferred message storage device,
wherein said response criteria are satisfied if is determined that said message logging device is faster than the preferred message storage device;

checking to determining if the preferred message storage device is unavailable, and wherein said response criteria are satisfied if is determined that said preferred message storage device is unavailable.

18. A message logging device, comprising:

a receiver configured to receive a multicast gap fill request message sent by a requesting device requesting one or more messages, said multicast gap fill request message including, as a destination address, a first multicast address corresponding to a first multicast group including a plurality of message logging devices, said plurality of message logging devices including said message logging device;

a determination module configured to determine if response criteria are satisfied, said determination module being configured to determine if the multicast clap fill request message indicates a preferred message storage device for supplying the requested one or more messages as part of being configured to determine if the response criteria are satisfied, said response criteria being satisfied if is determined that said clap fill request message does not indicate a preferred message storage device and said message logging device includes a requested message;

a response message generation module configured to generate, if it is determined that response criteria are satisfied, a unicast response message communicating at least one requested message; and a transmitter configured to transmit the unicast response message to the requesting device.

19. The message logging device of claim 18, wherein said multicast gap fill request messages requests one or more previously communicated multicast messages that were transmitted to the requesting device and said message logging device, each of the one or more previously communicated multicast messages included a multicast destination address corresponding to a second multicast group, said message logging device and said requesting device being members of said second multicast group.

20. The message logging device of claim 18, wherein said requesting device is another message logging device.

* * * * *